(12) United States Patent
Hirota et al.

(10) Patent No.: US 10,185,389 B2
(45) Date of Patent: Jan. 22, 2019

(54) POSTURE MEASURING DEVICE, POSTURE MEASURING METHOD, IMAGE PROCESSING DEVICE, IMAGE PROCESSING METHOD, AND IMAGE DISPLAY SYSTEM

(71) Applicant: SONY CORPORATION, Tokyo (JP)

(72) Inventors: Yoichi Hirota, Kanagawa (JP); Naomasa Takahashi, Chiba (JP); Tetsuya Hayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 15/025,679

(22) PCT Filed: Sep. 19, 2014

(86) PCT No.: PCT/JP2014/074969
§ 371 (c)(1),
(2) Date: Mar. 29, 2016

(87) PCT Pub. No.: WO2015/098211
PCT Pub. Date: Jul. 2, 2015

(65) Prior Publication Data
US 2016/0291688 A1 Oct. 6, 2016

(30) Foreign Application Priority Data
Dec. 25, 2013 (JP) .................. 2013-268015

(51) Int. Cl.
G06F 3/01 (2006.01)
G01C 21/16 (2006.01)
(Continued)

(52) U.S. Cl.
CPC ........... *G06F 3/012* (2013.01); *G01C 21/165* (2013.01); *G02B 27/01* (2013.01); *G02B 27/017* (2013.01);
(Continued)

(58) Field of Classification Search
CPC combination set(s) only.
See application file for complete search history.

(56) References Cited

U.S. PATENT DOCUMENTS

| 8,576,143 | B1 | 11/2013 | Kelly | |
|---|---|---|---|---|
| 2005/0068293 | A1* | 3/2005 | Satoh | G01C 9/00 345/158 |
| 2010/0259471 | A1* | 10/2010 | Takano | G02B 27/017 345/156 |

FOREIGN PATENT DOCUMENTS

| JP | 09-106322 A | 4/1997 |
|---|---|---|
| JP | 2005-107248 A | 4/2005 |

(Continued)

Primary Examiner — Van N Chow
(74) Attorney, Agent, or Firm — Chip Law Group

(57) ABSTRACT

An image display system 100 includes an attachment position error measuring function which measures deviation between reference axes of a head action tracking device 200 (x, y, z) and reference axes of the user ($x_w$, $y_w$, $z_w$), i.e., an attachment position error of the head action tracking device 200, and an attachment position error absorbing function which corrects, based on the attachment position error, posture information about a posture of the head of the user detected by the head action tracking device 200. An image drawing device 300 therefore renders, based on precise posture information, an image accurately following a motion of the head of the user.

12 Claims, 18 Drawing Sheets

(51) Int. Cl.
*G06F 3/14* (2006.01)
*G09G 3/00* (2006.01)
*G02B 27/01* (2006.01)

(52) U.S. Cl.
CPC .............. *G06F 3/01* (2013.01); *G06F 3/14* (2013.01); *G09G 3/001* (2013.01); *G02B 2027/014* (2013.01); *G02B 2027/0187* (2013.01); *G09G 2370/022* (2013.01); *G09G 2370/16* (2013.01)

(56) References Cited

FOREIGN PATENT DOCUMENTS

| | | | |
|---|---|---|---|
| JP | 2009-296228 | A | 12/2009 |
| JP | 2010-74228 | A | 4/2010 |
| JP | 2010-256534 | A | 11/2010 |
| JP | 2012-141461 | A | 7/2012 |
| WO | 2013/179427 | A | 12/2013 |

* cited by examiner

PLANE $S_G$ : $G_G \perp S_G$

POSTURE MEASURING DEVICE, POSTURE MEASURING METHOD, IMAGE PROCESSING DEVICE, IMAGE PROCESSING METHOD, AND IMAGE DISPLAY SYSTEM

TECHNICAL FIELD

A technology disclosed in the present specification relates to a posture measuring device and a posture measuring method for measuring a motion of the head of a user, an image processing device and an image processing method for processing an image following a motion of the head of a user, a display device and a display method for displaying an image following a motion of the head of a user, a computer program, and an image display system.

BACKGROUND ART

An image display device fixed to the head or face of a user who observes an image, or a head mount display, is known. The head mount display is equipped with an image display unit for each of the left and right eyes, for example, and configured to perform visual and audio control in cooperation with headphones. The head mount display attached to the head in a manner completely blocking the external environment increases virtual reality during viewing. The head mount display further has a function of displaying images different for each of the left eye and the right eye, and therefore is capable of displaying parallactic images for the left and right eyes to present a 3D-image.

This type of head mount display forms a virtual image on the retina of the eye as an image to be observed by the user. When an object is located in such a position that the distance between the object and a lens becomes shorter than the focal distance, a virtual image is formed on the object side. For example, a head mount display currently proposed positions a wide-view-angle virtual image optical system in front of the pupil with a distance of 25 millimeters from the pupil, and positions a display panel having an effective pixel range of approximately 0.7 inch in front of the wide-view-angle optical system to form an enlarged virtual image of a display image on the pupil of the user (for example, see Patent Document 1).

Moreover, the user wearing this type of head mount display is capable of observing an image cut from a wide-view-angle image. For example, there has been proposed a head mount display which realizes a 360-degree image of a whole space following a motion of the head of the user by using a head action tracking device constituted by a gyro sensor or the like and attached to the head of the user (for example, see Patent Document 2 and Patent Document 3). According to this method, an image following a motion of the head is reproduced by shifting the display area within the wide-view-angle image in such a direction as to cancel the motion of the head detected by the gyro sensor. In this case, the user experiences an overlook throughout the space.

It is preferable that the image presented by the head mount display follows the motion of the head of the user with higher accuracy. When tracking of the motion of the user is inaccurate, the image presented to the user may become an image inaccurately following the motion of the head of the user, or giving discomfort to the user.

SUMMARY OF THE INVENTION

Problems to be Solved by the Invention

An objective of the technology disclosed in the present specification is to provide a posture measuring device and a posture measuring method, an image processing device and an image processing method, a display device and a display method, a computer program, and an image display system, each of which is excellent in presenting an image following a motion of the head of a user.

Solutions to Problems

The present application has been filed in consideration of the aforementioned problems. A technology as set forth in claim 1 is directed to a posture measuring device including:
a sensor unit that detect a posture;
an attachment position error measuring unit that measures an attachment position error of the sensor unit;
an attachment position error absorbing unit that corrects, based on the attachment position error, posture information detected by the sensor unit; and
a transmission unit that transmits the corrected posture information to an external device.

According to a technology as set forth in claim 2 of the present application, the posture measuring device of claim 1 is attached to the head of a user at the time of use. The sensor unit detects a posture of the head. The attachment position error measuring unit measures deviation of a reference axis of the sensor unit from a reference axis of the user. The attachment position error absorbing unit corrects, based on the deviation, the posture information detected by the sensor unit.

According to a technology as set forth in claim 3 of the present application, the posture measuring device of claim 1 is attached to the head of a user at the time of use. The transmission unit transmits the corrected posture information to the external device that renders an image following a motion of the head of the user.

According to a technology as set forth in claim 4 of the present application, the sensor unit of the posture measuring device of claim 2 is capable of detecting a gravity vector. The attachment position error measuring unit measures the attachment position error based on gravity vectors detected for two postures of the user.

According to a technology as set forth in claim 5 of the present application, the attachment position error measuring unit of the posture measuring device of claim 4 determines a $y_w$ axis corresponding to a reference axis of the user with respect to reference axes x, y, and z of the sensor unit based on a gravity vector $G_G$ detected when the user faces the front, determines a $z_w$ axis corresponding to a reference axis of the user with respect to the reference axes x, y, and z of the sensor based on a gravity vector $G_F$ detected when the user faces directly above or a gravity vector $G_{SF}$ detected when the user faces obliquely above, determines an $x_w$ axis corresponding to a reference axis of the user based on outer product calculation of the $y_w$ axis and the $z_w$ axis, and calculates a transformation matrix M based on a relationship between the reference axes x, y, and z of the sensor and the reference axes $x_w$, $y_w$, and $z_w$ of the user. The attachment position error absorbing unit multiplies a rotation matrix $M_R$ by the transformation matrix M, the rotation matrix $M_R$ indicating the posture information detected by the sensor unit, then corrects the attachment position error.

According to a technology as set forth in claim 6 of the present application, the attachment position error measuring unit of the posture measuring device of claim 5 measures the gravity vector G in response to display or voice output of a message from the display device for urging the user to face the front, and measures the gravity vector $G_F$ or $G_{SF}$ in response to display or voice output of a message from the display device for urging the user to face directly above or obliquely above.

A technology as set forth in claim 7 is directed to a posture measuring method including:

an attachment position error measuring step that measures an attachment position error of a sensor unit which detects a posture;

an attachment position error absorbing step that corrects, based on the attachment position error, posture information detected by the sensor unit; and a transmission step that transmits the corrected posture information to an external device.

A technology as set forth in claim 8 is directed to an image processing device including:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a transmission unit that transmits the image processed by the image drawing processing unit to a display device.

According to a technology as set forth in claim 9 of the present application, the image drawing processing unit of the image processing device of claim 8 renders, based on the posture information, an image following a motion of the head of the user.

According to of the present application, the attachment position error measuring unit of the image processing device measures deviation of a reference axis of the head action tracking device from a reference axis of the user, and the attachment position error absorbing unit corrects, based on the deviation, posture information received from the head action tracking device.

According to the present application, the attachment position error measuring unit of the image processing device measures the attachment position error based on gravity vectors received for two postures of the user from the head action tracking device.

According to the present application, the attachment position error measuring unit of the image processing device determines a $y_w$ axis corresponding to a reference axis of the user with respect to reference axes x, y, and z of the sensor unit based on a gravity vector $G_G$ detected when the user faces the front, determines a $z_w$ axis corresponding to a reference axis of the user with respect to the reference axes x, y, and z of the sensor unit based on a gravity vector $G_F$ detected when the user faces directly above or a gravity vector $G_{SF}$ detected when the user faces obliquely above, determines an $x_w$ axis corresponding to a reference axis of the user based on outer product calculation of the $y_w$ axis and the $z_w$ axis, and calculates a transformation matrix M based on a relationship between the reference axes x, y, and z of the sensor and the reference axes $x_w$, $y_w$, and $z_w$ of the user. The attachment position error absorbing unit multiplies a rotation matrix $M_R$ by the transformation matrix M, the rotation matrix $M_R$ indicating the posture information detected by the sensor unit, then corrects the attachment position error.

According to the present application, the attachment position error measuring unit of the image processing device measures the gravity vector $G_G$ in response to display or voice output of a message from the display device for urging the user to face the front, and measures the gravity vector $G_F$ or $G_{SF}$ in response to display or voice output of a message from the display device for urging the user to face directly above or obliquely above.

A technology is directed to an image processing method including:

a reception step that receives information containing posture information about a posture of the head of a user from a head action tracking device attached to the head of the user;

an attachment position error measuring step that measures an attachment position error of the head action tracking device;

an attachment position error absorbing step that corrects, based on the attachment position error, posture information received from the head action tracking device;

an image drawing processing step that processes an image based on the corrected posture information; and a transmission step that transmits the image processed by the image drawing processing unit to a display device.

A technology is directed to a display device fixed to the head or face of a user at the time of use, the display device including:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a display unit that displays an image processed by the image drawing processing unit.

According to a technology of the present application, the attachment position error measuring unit of the display device determines a $y_w$ axis corresponding to a reference axis of the user with respect to reference axes x, y, and z of the sensor unit based on a gravity vector $G_G$ detected when the user faces the front, determines a $z_w$ axis corresponding to a reference axis of the user with respect to the reference axes x, y, and z of the sensor based on a gravity vector $G_F$ detected when the user faces directly above or a gravity vector $G_{SF}$ detected when the user faces obliquely above, determines an $x_w$ axis corresponding to a reference axis of the user based on outer product calculation of the $y_w$ axis and the $z_w$ axis, and calculates a transformation matrix M based on a relationship between the reference axes x, y, and z of the sensor and the reference axes $x_w$, $y_w$, and $z_w$ of the user. The attachment position error absorbing unit multiplies a rotation matrix $M_R$ by the transformation matrix M, the rotation matrix $M_R$ indicating the posture information detected by the sensor unit, then corrects the attachment position error.

A technology is directed to a computer program described in a computer-readable format, under the program a computer performs functions of:

an attachment position error measuring unit that measures an attachment position error of a sensor unit which detects a posture;

an attachment position error absorbing unit that corrects, based on the attachment position error, posture information detected by the sensor unit; and a transmission unit that transmits the corrected posture information to an external device.

A technology is directed to a computer program described in a computer-readable format, under the program a computer performs functions of:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a transmission unit that transmits the image processed by the image drawing processing unit to a display device.

A technology is directed to a computer program described in a computer-readable format, under the program a computer performs functions of:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a display unit that displays an image processed by the image drawing processing unit.

The computer programs according to the present application is defined as a computer program described in a computer-readable format to realize predetermined processes by using a computer. In other words, the computer programs according to the present application is installed into a computer to perform cooperative operations by using the computer and thereby offer advantageous effects similar to those of the posture measuring device, the image processing device, and the display device according to the present application.

A technology is directed to an image display system including:

a head action tracking device that measures a posture of the head of a user;

an attachment position error measuring function that measures an attachment position error of the head action tracking device;

an attachment position error absorbing function that corrects, based on the attachment position error, posture information measured by the head action tracking device;

an image drawing device that renders an image based on the corrected posture information; and a display device that displays an image rendered by the image drawing device.

The "system" in this context refers to a logical collection of a plurality of devices (or function modules for realizing particular functions). The respective devices or function modules may be either accommodated within a single housing or not.

Effects of the Invention

Provided according to the technology disclosed in the present specification are a posture measuring device and a posture measuring method, an image processing device and an image processing method, a display device and a display method, a computer program, and an image display system, each of which is excellent in presenting an image following a motion of the head of a user.

According to the technology disclosed in the present specification, there are provided an attachment position error measuring function which measures an attachment error of a head action tracking device for tracking an action of the head of a user, and an attachment position error absorbing function which corrects, based on the attachment position error, posture information about a posture of the head of the user measured by the head action tracking device. Accordingly, the posture information measured by the head action tracking device is correctable in a manner easy for the user. Moreover, according to the technology disclosed in the present specification, precise posture information is obtained regardless of the attachment position of the head action tracking device. Accordingly, an image to be rendered accurately follows a motion of the head of the user.

Effects offered by the present invention are not limited to the effects described in the present specification presented only by way of example. Additional effects may be offered by the present invention as well as the effects described herein.

Other purposes, characteristics, and advantages of the technology disclosed in the present specification will become apparent in light of more detailed description with reference to an embodiment discussed below and accompanying drawings.

MODE FOR CARRYING OUT THE INVENTION

An embodiment according to the technology disclosed in the present specification is hereinafter described in detail with reference to the drawings.

Figure 1:
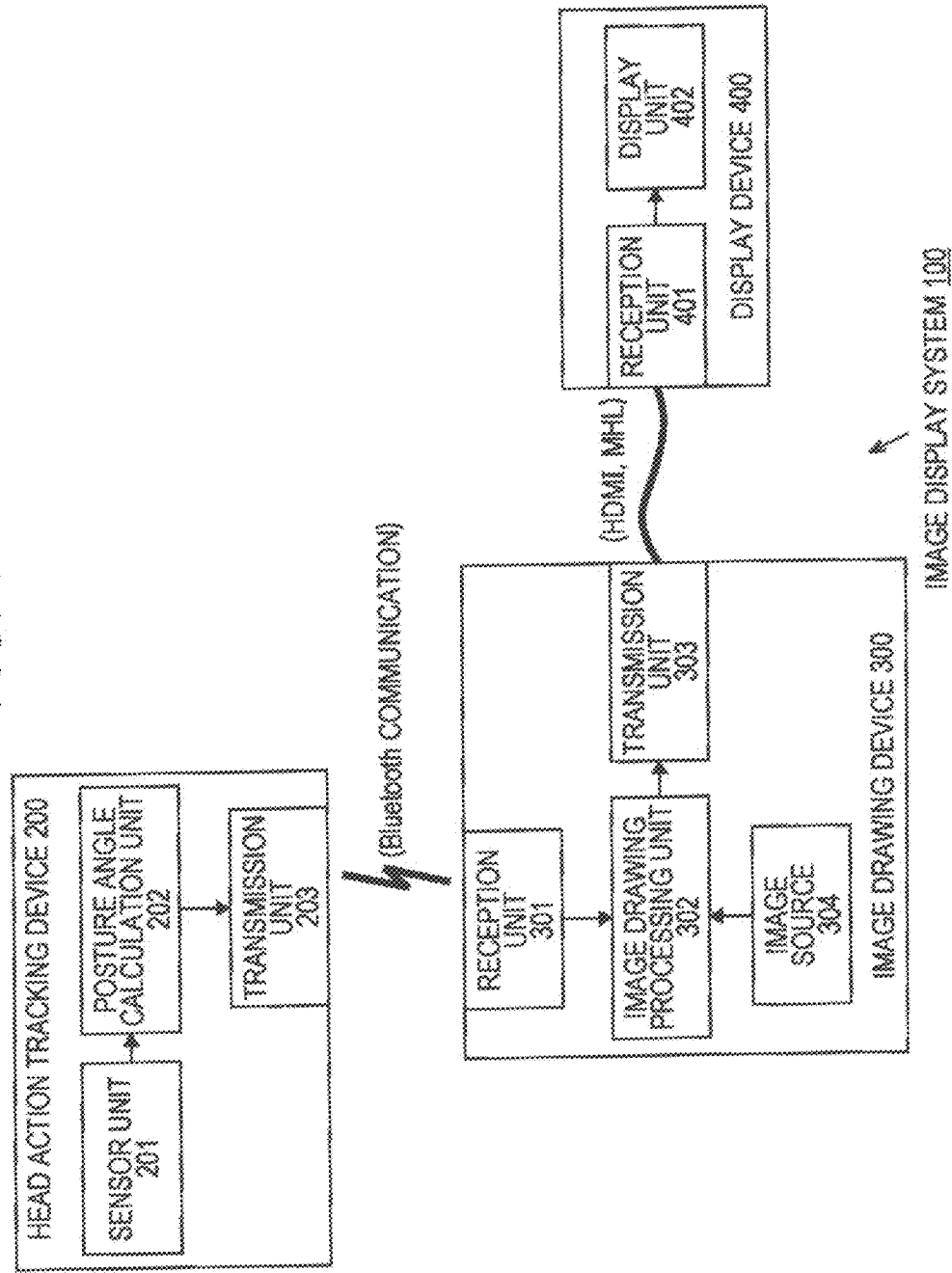
FIG. 1 is a view schematically illustrating a configuration example of an image display system 100 according to the technology disclosed in the present specification.

FIG. 1 schematically illustrates a configuration example of an image display system 100 to which the technology disclosed in the present specification has been applied. The image display system 100 illustrated in the figure is constituted by a head action tracking device 200, an image drawing device 300, and a display device 400.

The head action tracking device 200 is attached to the head of a user who observes an image displayed by the display device 400, and outputs posture information about a posture of the head of the user to the image drawing device 200 in a predetermined transmission cycle. According to the example illustrated in the figure, the head action tracking device 200 includes a sensor unit 201, a posture angle calculation unit 202, and a transmission unit 203 which transmits obtained posture information to the image drawing device 300.

The sensor unit 201 is constituted by a combination of a plurality of sensor devices such as a gyro sensor, an acceleration sensor, and a geomagnetic sensor. The sensor unit 201 used herein is constituted by a triaxial gyro sensor, a triaxial acceleration sensor, and a triaxial geomagnetic sensor for detecting nine axes in total. According to this embodiment, the sensor unit 201 includes a sensor device capable of detecting a gravity vector, such as an acceleration sensor.

The posture angle calculation unit 202 calculates posture information about a posture of the head of the user based on detection results of the nine axes obtained from the sensor unit 201. The transmission unit 203 transmits the obtained posture information to the image drawing device 300. According to this embodiment, the posture information is expressed in the form of a rotation matrix. However, the head action tracking device 200 having obtained the detection results such as a gravity vector from the sensor unit 201 may output the detection results via the transmission unit 203 without change, rather than output as posture information expressed in a rotation matrix.

According to the image display system 100 illustrated in the figure, the head action tracking device 200 and the image drawing device 300 are connected with each other via wireless communication such as Bluetooth (registered trademark) communication. Needless to say, the head action tracking device 200 and the image drawing device 300 may be connected via a high-speed wired inface such as USB (Universal Serial Bus).

The image drawing device 300 renders an image displayed by the display device 400. The image drawing device 300 is constituted by a terminal equipped with Android (registered trademark) such as a smartphone, a personal computer, or a game machine. However, the image drawing device 300 may be constituted by other devices.

According to the example illustrated in the figure, the image drawing device 300 includes a reception unit 301 for receiving posture information from the head action tracking device 200, an image drawing processing unit 302 for rendering an image based on posture information, a transmission unit 302 for transmitting the rendered image to the display device 400, and an image source 304 functioning as a supply source of image data.

The reception unit 301 receives posture information from the head action tracking device 200 via Bluetooth (registered trademark) communication, for example. As mentioned above, posture information is expressed in the form of a rotation matrix.

The image source 304 is constituted by a storage device such as an hard disc drive (HDD) and an solid state drive (SSD) for recording image content, a media reproduction device for reproducing recording media such as a Blu-ray (registered trademark), a broadcasting tuner for selecting and receiving digital broadcasting signals, and a communication interface for receiving image content from a server on the Internet or the like, for example.

The image drawing processing unit 302 renders an image based on image data received from the image source 304 to display the rendered image on the display device 400. The image drawing processing unit 302 receives a wide-view-angle original image, such as an omnidirectional original image and 4K image, from the image source 304, and renders an image cut from the original image at a display angle of view corresponding to posture information received from the reception unit 301.

The image drawing device 300 and the display device 400 are connected via a wired cable such as high definition multimedia interface (HDMI) (registered trademark) and mobile high-definition link (MHL). Alternatively, both the devices 300 and 400 may be connected via wireless communication such as wireless HD and Miracast. A transmission unit 303 transmits image data rendered by the image drawing processing unit 302 to the display device 400 via any one of these communication paths.

The display device 400 includes a reception unit 401 for receiving an image from the image drawing device 300, and a display unit 402 for displaying the received image. The display device 400 is constituted by a head mount display fixed to the face or head of the user who observes an image, for example.

The reception unit 401 receives image data from the image drawing device 300 via a communication path such as HDMI (registered trademark) and MHL. The display unit 402 displays received image data on a screen.

When the display device 400 is constituted by a head mount display, the display unit 402 includes left and right screens fixed to the left and right eyes of the user to display a left image and a right image, respectively. Each of the screens of the display unit 402 is constituted by a display panel, such as a micro-display including an organic electroluminescence (EL) device and a liquid crystal display, or a laser scanning system display such as a retina direct drawing display. Each of the screens further includes a virtual image optical unit which projects an enlarged display image of the display unit 402 to form an enlarged virtual image at a predetermined angle of view on the pupil of the user.

The image drawing device 300 receives a wide-view-angle original image, such as an omnidirectional original image and 4K image, and renders an image cut from the original image at a display angle of view corresponding to posture information about a posture of the head of the user. On the display device 400 side, the display area within the original image shifts in such a direction as to cancel a posture angle of the head of the user. Accordingly, the image to be reproduced follows the motion of the head, wherefore the user is allowed to experience an overlook throughout a large screen. The display device 400 may vary output of voices in accordance with movement of the image.

Figure 2:
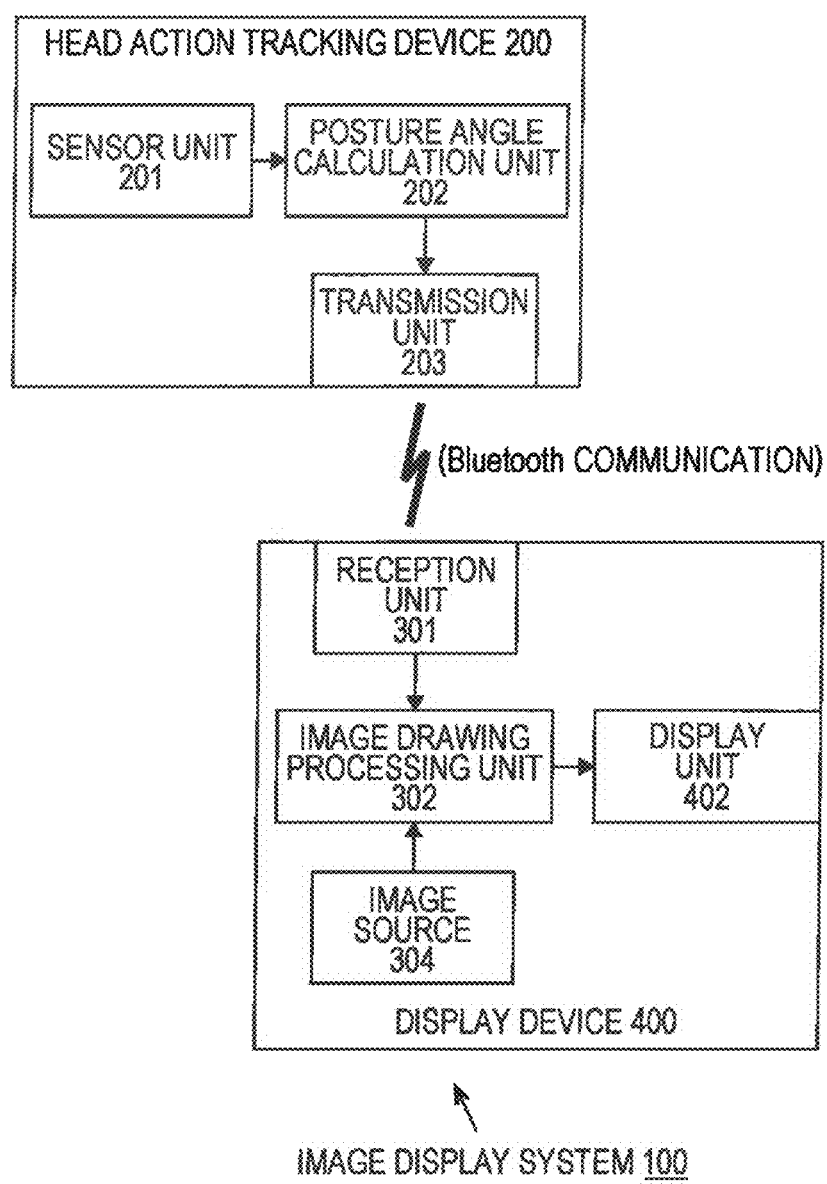
FIG. 2 is a view schematically illustrating a modified example of the image display system 100.

FIG. 2 schematically illustrates a modified example of the image display system 100. According to the example illustrated in FIG. 1, the image display system 100 is constituted by the three independent devices of the head action tracking device 200, the image drawing device 300, and the display device 400. However, according to the example illustrated in FIG. 2, the function of the image drawing device 300 is included in the display device 400. When the head action tracking device 200 is provided as an optional product attached outside the display device 400 as illustrated in FIG. 1, the size, weight, and cost of the display device 400 are allowed to decrease.

Figure 18:
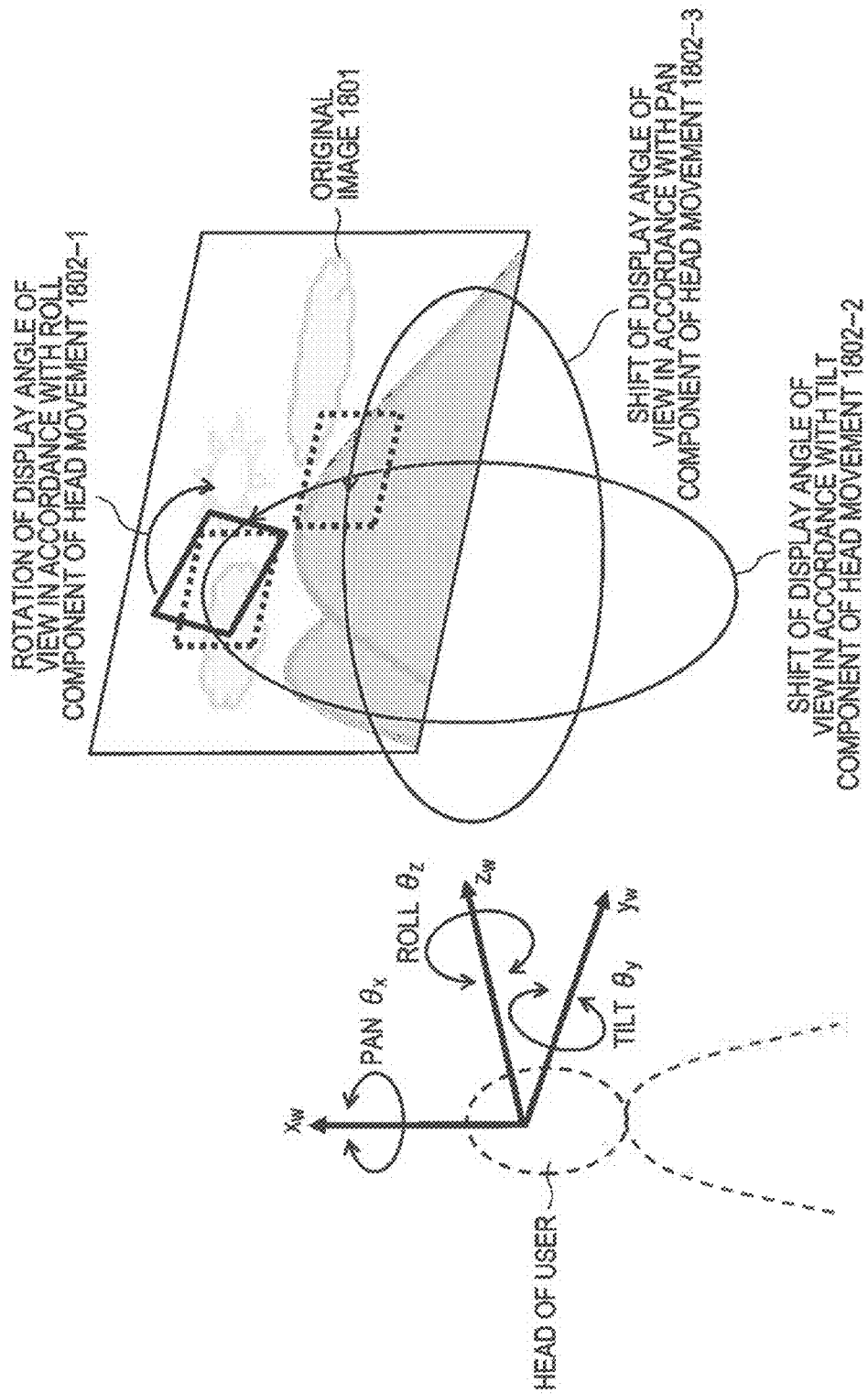
FIG. 18 is a view illustrating a mechanism for displaying an image following a motion of the head of the user on the display device 400 of the image display system 100 illustrated in FIG. 1 or 2.

FIG. 18 illustrates a mechanism of the image display system 100 in FIG. 1 or 2 for displaying an image following a motion of the head of the user on the display device 400.

It is assumed herein that a depth direction, a horizontal direction, and a vertical direction of a line of sight of the user are defined as $z_w$ axis, $y_w$ axis, and $x_w$ axis, respectively, and that the origin position of the reference axes $x_w$, $y_w$, and $z_w$ of the user corresponds to a point of view of the user. Accordingly, a roll $\theta_z$, a tilt $\theta_y$, and a pan $\theta_z$ correspond to movements of the head of the user around the $z_w$ axis, $y_w$ axis, and $x_w$ axis, respectively.

The head action tracking device 200 detects position information constituted by motions in the respective directions of the roll, tilt, and pan of the head of the user ($\theta_z$, $\theta_y$, $\theta_z$), and a parallel shift of the head, and outputs the detected information to the image drawing device 300 in the form of a rotation matrix $M_R$. However, the head action tracking device 200 corrects an error of the rotation matrix M before outputting the posture information depending on cases. This case will be described in detail below.

The image drawing device 300 receives a wide-view-angle original image 1801, such as an omnidirectional original image and 4K image, and renders an image cut from the original image 1801 at a display angle of view 1802 corresponding to posture information about a posture of the head of the user. The image drawing device 300 rotates a display angle of view 1802-1 in accordance with a roll component of the head movement of the user, shifts a display angle of view 1802-2 in accordance with a tilt component of the head movement of the user, and shifts a display angle of view 1802-3 in accordance with a pan component of the head movement of the user to shift the display angle of view in such a direction as to cancel the motion of the head detected by the head action tracking device 200. The display device 400 may present an image which shows the display area shifting to follow the motion of the head of the user within the original image 1801.

Figure 3:
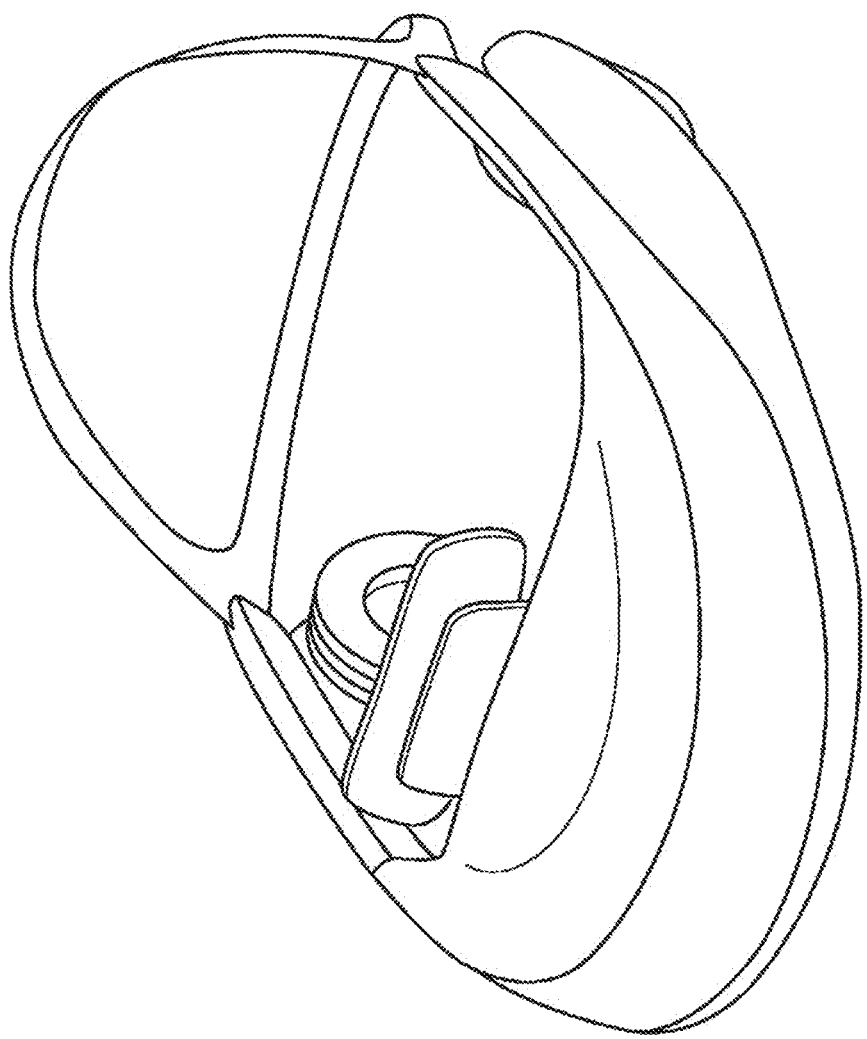
FIG. 3 is a view (perspective view) illustrating an external appearance configuration of a display device 400.
Figure 4:
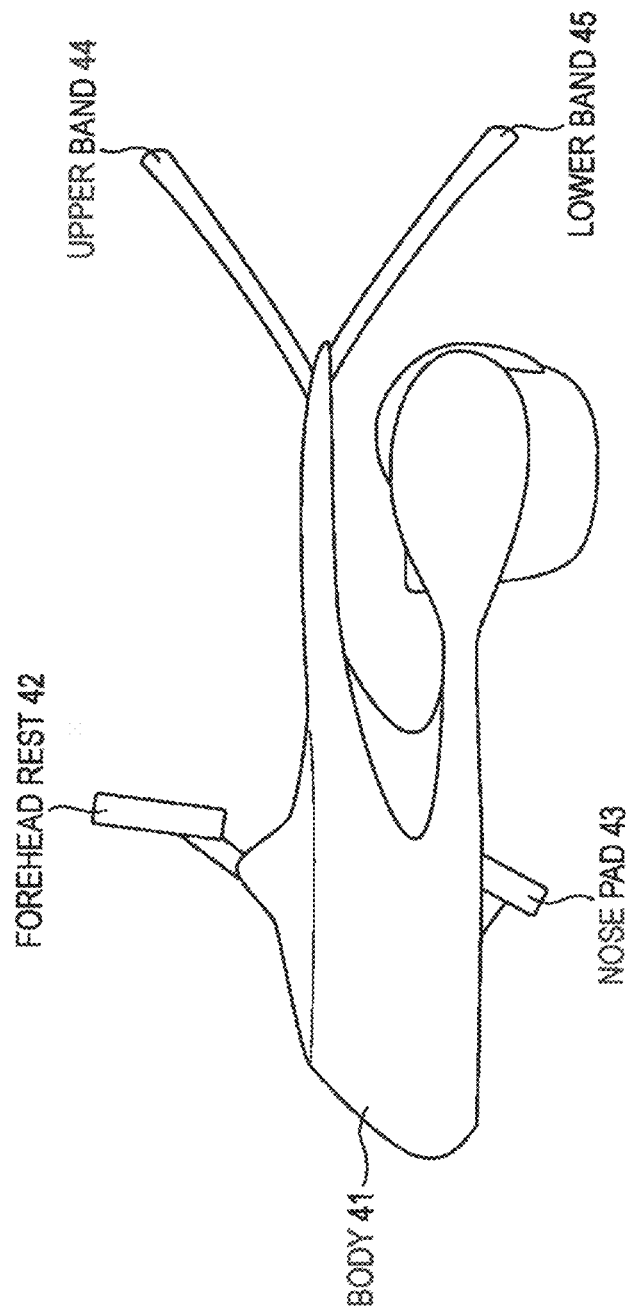
FIG. 4 is a view (left side view) illustrating the external appearance configuration of the display device 400.

FIGS. 3 and 4 illustrate an external appearance configuration of the display device 400. According to the example illustrated in the figures, the display device 400 is constituted by a head mount display fixed to the head or face of the user who observes an image. FIG. 3 is a perspective view of the head mount display, while FIG. 4 is a left side view of the head mount display.

The display device 400 illustrated in the figures has a shape of a cap, or a band shape surrounding the entire circumference of the head to disperse the load of the device throughout the head and thereby reduce a burden on the user while the user is wearing the display device 400.

The display device 400 includes a body 41 containing a major part of components such as a display system, a forehead rest 42 projecting from an upper surface of the body 41, a head band branched into an upper band 44 and a lower band 45, and left and right headphones. The body 41 accommodates a display unit and a circuit board. A nose pad 43 following the back of the nose is provided below the body 41.

When the display device 400 is attached to the head of the user, the forehead rest 42 comes into contact with the forehead of the user. Simultaneously, the upper band 44 and the lower band 45 of the head band come into contact with the back of the head. In this condition, the display device 400 is attached to the head of the user by three-point supports of the forehead rest 42, the upper band 44, and the lower band 45. Accordingly, the display device 400 is capable of dispersing the load of the display device 400 throughout the head to reduce the burden on the user wearing the display device 400, unlike a structure of ordinary glasses of which weight is supported chiefly by a nose pad. The nose pad 43 of the display device 400 illustrated in the figures only provides supplementary support. Moreover, movement of the display device 400 in a rotational direction may be regulated by fastening the forehead rest 42 via the head band to avoid rotation of the display device 400 with respect to the head of the user wearing the display device 400.

The head action tracking device 200 may be mounted within the body 41 of the display device 400 constituted by the head mount display. According to this embodiment, however, the head action tracking device 200 is provided as an optional product attached outside the display device 400 for the purpose of reduction of the size, weight, and cost of the display device 400. The head action tracking device 200 is attached, as an accessory, to an arbitrary position such as the positions of the upper band 44, the lower band 45, and the forehead rest 42 of the display device 400.

Accurate tracking of the posture of the head of the user by the head action tracking device 200 is required to present on the display device 400 an image showing the shift of the display angle of view in the direction following the motion of the head of the user as illustrated in FIG. 18. When accurate tracking is difficult, the image to be presented may become an image inaccurately following the motion of the head of the user, or giving discomfort to the user.

Figure 5:
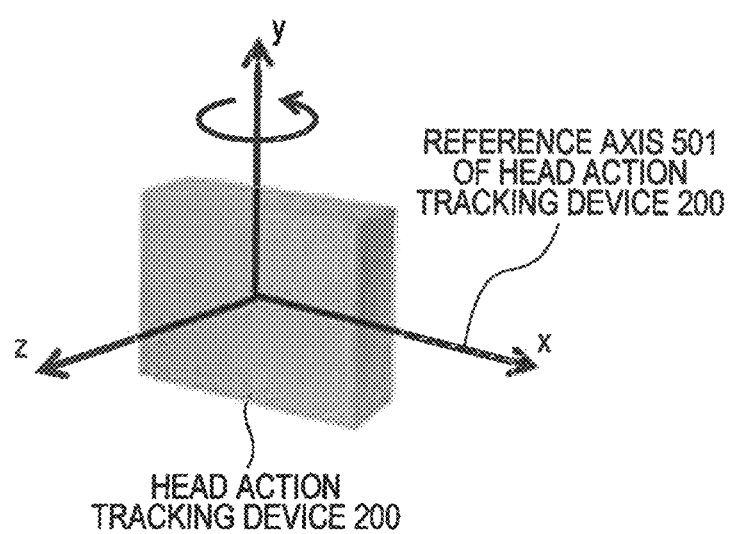
FIG. 5 is a view illustrating reference axes (x, y, x) of a head action tracking device 200.
Figure 6:
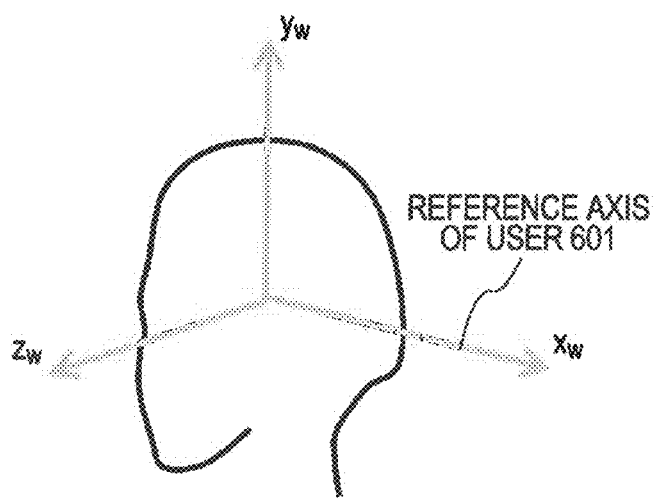
FIG. 6 is a view illustrating reference axes ($x_w$, $y_w$, $z_w$) of a user.

The head action tracking device 200 is constituted by a combination of a plurality of sensor devices, such as a gyro sensor, an acceleration sensor, and a geomagnetic sensor to detect nine axes. For accurate detection of the posture of the head of the user by the head action tracking device 200, alignment between reference axes of the head action tracking device 200 (x, y, z) (reference number 501 in FIG. 5) and the reference axes of the user ($x_w$, $y_w$, $z_w$) (reference number 601 in FIG. 6) is required.

Figure 7:
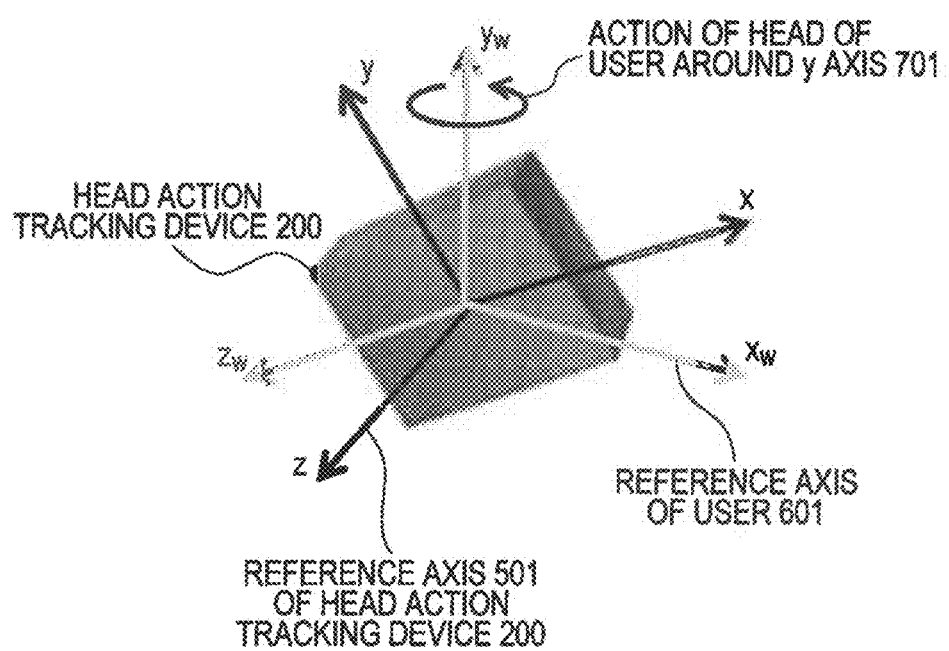
FIG. 7 is a view illustrating a state of misalignment between the reference axes (x, y, z) of the head action tracking device 200 and the reference axes ($x_w$, $y_w$, $z_w$) of the user.

When the reference axes 501 of the head action tracking device 200 (x, y, z) and the reference axes 601 of the user ($x_w$, $y_w$, $z_w$) do not align with each other (see FIG. 7), accurate detection of the posture of the head of the user becomes difficult. In this case, the head action tracking device 200 is difficult to detect a motion of the head of the user as rotation around the y axis even when the user rotates the head around the $y_w$ axis (yaw) as indicated by a reference number 701 in FIG. 7, for example. As a result, the display device 400 is difficult to present an image following the motion of the head of the user, or presents an image giving discomfort to the user. Accordingly, operation for fixing the head action tracking device 200 to the head of the user, i.e., a structure for determining an attachment position of the head action tracking device 200 is needed to position the reference axes (x, y, z) in alignment with the reference axes ($x_w$, $y_w$, $z_w$) of the user.

When the head action tracking device 200 constituting the head mount display is mounted within the body 41 of the display device 400, correction for the attachment position of the head action tracking device 200 is needed only once on the assumption that the user wears the head mount display every time in the same wearing manner.

However, when the head action tracking device 200 is attached as an accessory to the upper band 44 of the display device 400, for example, the attachment position varies every time the head action tracking device 200 is attached. It is not practical to correct the attachment position of the head action tracking device 200 every time the head action tracking device 200 is attached.

Even when the head action tracking device 200 is mounted within the body 41 of the display device 400 constituting the head mount display, the attachment method varies for each person depending on the head shape, preference and other conditions of the user, wherefore personal deviation of the reference axes may be produced. Furthermore, an identical user does not necessarily wear the display device 400 in the same manner every time the user wears the display device 400, wherefore deviation of the reference axes may be produced for each attachment of the display device 400.

Accordingly, the image display system 100 in this embodiment has an attachment position error measuring function for measuring deviation between the reference axes of the head action tracking device 200 (x, y, z) and the reference axes of the user ($x_w$, $y_w$, $z_w$), i.e., an attachment position error of the head action tracking device 200, and further an attachment position error absorbing function for correcting posture information based on the attachment position error, which posture information indicates a posture of the head of the user detected by the head action tracking device 200. These functions achieve correction of the posture information even when an attachment position error is produced for each attachment of the head action tracking device 200, or when an attachment position error varies for each user, thereby allowing the image drawing device 300 to render an image which accurately follows the motion of the head of the user.

The attachment position error measuring function of the head action tracking device 200 is initially described.

It is assumed that the user wearing the head action tracking device 200 faces the front in a stationary state. When a gravity vector is measured in this state by the head action tracking device 200, an upward vector $G_G$ corresponding to the vertical direction of the user is detected as indicated by a reference number 801 in FIG. 8.

Figure 8:
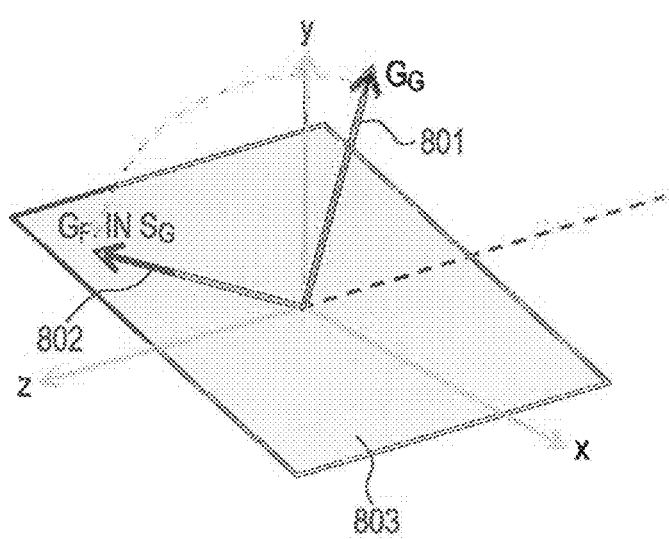
FIG. 8 is a view illustrating an attachment position error measuring function of the head action tracking device 200 (when user is instructed to face directly above).

It is further assumed that the user wearing the head action tracking device 200 faces above in a stationary state. When a gravity vector is measured in this state by the head action tracking device 200, a frontward vector $G_F$ corresponding to the frontward direction of the user is detected as indicated by a reference number 802 in FIG. 8. A plane $S_G$ indicated by a reference number 803 in FIG. 8 is a plane perpendicular to the upward vector $G_G$. The frontward vector $G_F$ is located in the plane $S_G$. The frontward vector $G_F$ is similarly detected when the user faces below in a stationary state.

Figure 9:
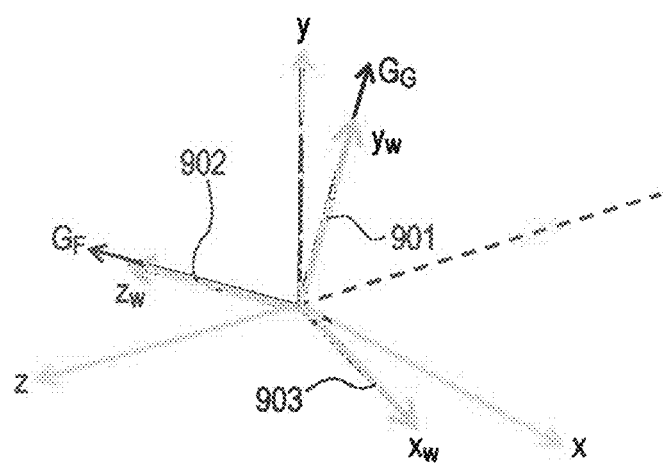
FIG. 9 is a view illustrating the attachment position error measuring function of the head action tracking device 200 (when user is instructed to face directly above).

As indicated by a reference number 901 in FIG. 9, the upward vector $G_G$ corresponds to the upward direction, i.e., the $y_w$ axis of the reference axes of the user. On the other hand, the frontward vector $G_F$ corresponds to the frontward direction, i.e., the $z_w$ axis of the reference axes of the user as indicated by a reference number 902 in FIG. 9. The two axes $y_w$ and $z_w$ of the reference axes of the user are determined in this manner. More specifically, the two axes $y_w$ ($y_w(x)$, $y_w(y)$, $y_w(z)$), and $z_w$ ($z_w(x)$, $z_w(y)$, $z_w(z)$) of the reference axes of the user as viewed from the reference axes x, y, and z of the head action tracking device 200 are determined.

The $x_w$ axis indicated by a reference number 903 in FIG. 9 is also calculated based on outer product calculation of the $y_w$ and $z_w$. Accordingly, the reference axis $x_w$ of the user ($x_w(x)$, $x_w(y)$, $x_w(z)$) as viewed from the reference axes x, y, and z of the head action tracking device 200 is similarly determined in this manner.

According to the attachment position error measuring method described with reference to FIGS. 8 and 9, the user is required to face in the front direction and in the two directions of directly above and directly below in a stationary state. For the user, it is easy to face the front, but is difficult to face directly above and directly below in a stationary posture.

Accordingly, further proposed herein is a method which measures an attachment position error in a state that the user is facing obliquely above or obliquely below, instead of facing directly above and directly below. For the user, the posture facing obliquely above or obliquely below is comfortable, wherefore the stationary posture in this state is considered as a relatively easy posture.

Figure 10:
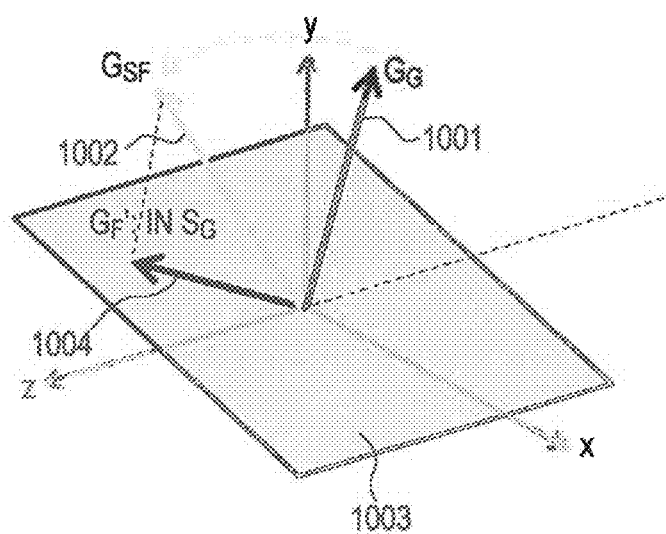
FIG. 10 is a view illustrating the attachment position error measuring function of the head action tracking device 200 (when user is instructed to face obliquely above).

The user wearing the head action tracking device 200 faces the front in a stationary state. When a gravity vector is measured in this state by the head action tracking device 200, an upward vector $G_G$ corresponding to the vertical direction of the user is detected as indicated by a reference number 1001 in FIG. 10.

It is further assumed that the user wearing the head action tracking device 200 faces obliquely above in a stationary state. When a gravity vector is measured in this state by the head action tracking device 200, a frontward and obliquely upward vector $G_{SF}$ is detected as indicated by a reference number 1002 in FIG. 10. When the frontward and obliquely upward vector $G_{SF}$ is projected on a plane $S_G$ indicated by a reference number 1003 in FIG. 10, a vector $G_F{'}$ corresponding to the frontward vector $G_F$ is obtained as indicated by a reference number 1004.

Figure 11:
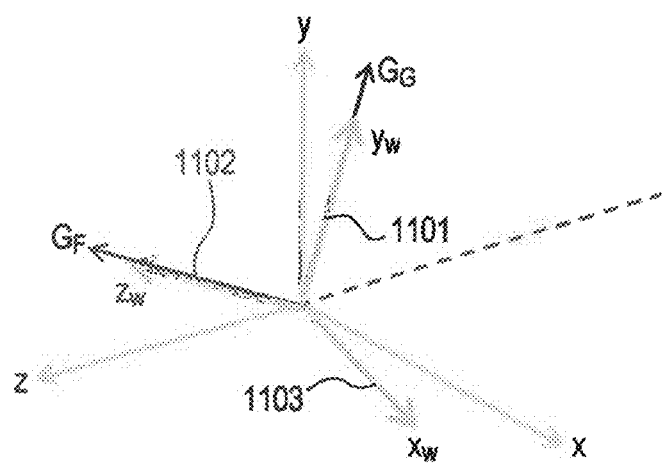
FIG. 11 is a view illustrating the attachment position error measuring function of the head action tracking device 200 (when user is instructed to face obliquely above).

The upward vector $G_G$ corresponds to the upward direction, i.e., the $y_w$ axis of the reference axes of the user as indicated by a reference number 1101 in FIG. 11. On the other hand, the vector $G_F{'}$ corresponds to the frontward direction, i.e., the $z_w$ axis of the reference axes of the user as indicated by a reference number 1102 in FIG. 11. The two axes $y_w$ and $z_w$ of the reference axes of the user are determined in this manner. More specifically, the two axes $y_w$ ($y_w(x)$, $y_w(y)$, $y_w(z)$), and $z_w$ ($z_w(x)$, $z_w(y)$, $z_w(z)$) of the reference axes of the user as viewed from the reference axes x, y, and z of the head action tracking device 200 are determined.

In addition, the $x_w$ axis indicated by a reference number 1103 in FIG. 11 is calculated based on outer product calculation of the $y_w$ and $z_w$. Accordingly, the reference axis $x_w$ of the user ($x_w(x)$, $x_w(y)$, $x_w(z)$) as viewed from the reference axes x, y, and z of the head action tracking device 200 is similarly determined in this manner.

The attachment position error absorbing function is now described.

The relationship between the coordinate system xyz of the head action tracking device 200 and the coordinate system $x_w y_w z_w$ of the user is expressed by following Formula (1).

[Mathematical Formula 1]

$$\begin{pmatrix} x \\ y \\ z \end{pmatrix} = \begin{pmatrix} x_w(x) & x_w(y) & x_w(z) \\ y_w(x) & y_w(y) & y_w(z) \\ z_w(x) & z_w(y) & z_w(z) \end{pmatrix} \times \begin{pmatrix} x_w \\ y_w \\ z_w \end{pmatrix} \quad (1)$$

When a matrix $M^{-1}$ is defined as following Formula (2), the coordinate system xyz of the head action tracking device 200 is converted into the coordinate system $x_w y_w z_w$ of the user by using a transformation matrix M as expressed by following Formula (3).

[Mathematical Formula 2]

$$M^{-1} = \begin{pmatrix} x_w(x) & x_w(y) & x_w(z) \\ y_w(x) & y_w(y) & y_w(z) \\ z_w(x) & z_w(y) & z_w(z) \end{pmatrix} \quad (2)$$

[Mathematical Formula 3]

$$M \times \begin{pmatrix} x \\ y \\ z \end{pmatrix} = \begin{pmatrix} x_w \\ y_w \\ z_w \end{pmatrix} \quad (3)$$

Accordingly, assuming that posture information output from the head action tracking device 200 is represented by the rotation matrix $M_R$, the transformation matrix M is multiplied by $M_R$ to correct posture information provided on the reference axes x, y, and z of the head action tracking device 200 into posture information provided on the reference axes $x_w$, $y_w$, and $z_w$ of the user.

The foregoing attachment position error measuring function and attachment position error absorbing function may be given to the head action tracking device 200 to transmit corrected posture information to the image drawing device 300, for example. Alternatively, the attachment position error measuring function and attachment position error absorbing function may be given to the image drawing device 300 to allow the image drawing device 300 to correct posture information received from the head action tracking device 200 and containing an attachment position error before performing an image drawing process.

Figure 12:
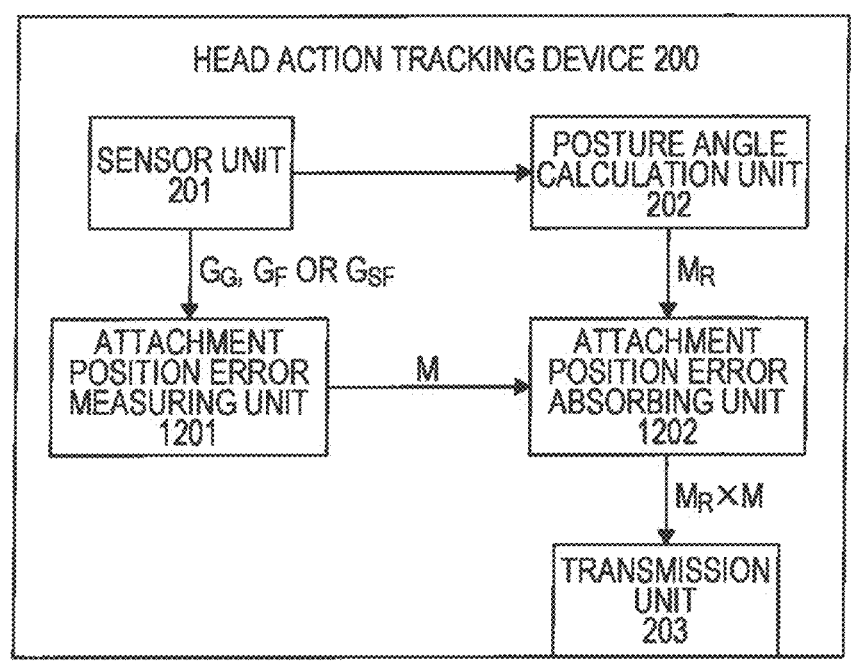
FIG. 12 is a view schematically illustrating a functional configuration of the head action tracking device 200 including the attachment position error measuring function and an attachment position error absorbing function.

FIG. 12 illustrates a functional configuration of the head action tracking device 200 including the attachment position error measuring function and the attachment position error absorbing function.

The sensor unit 201 is constituted by a combination of a plurality of sensor devices, such as a gyro sensor, an acceleration sensor, and a geomagnetic sensor to detect nine axes. The posture angle calculation unit 202 calculates a posture angle of the head of the user based on detection results of the nine axes obtained from the sensor unit 201, and outputs the rotation matrix $M_R$ indicating posture information.

An attachment position error measuring function unit 1201 monitors a gravity vector measured by the sensor unit 201.

The attachment position error measuring function unit 1201 determines the reference axis $y_w$ of the user on the coordinate system xyz of the head action tracking device 200 based on a gravity vector obtained at the timing of the stationary state of the user facing the front, i.e., the upward vector $G_G$.

The attachment position error measuring function unit 1201 further determines the reference axis $z_w$ of the user on the coordinate system xyz of the head action tracking device 200 based on a gravity vector obtained at the timing of the stationary state of the user facing above, i.e., the frontward vector $G_F$. Alternatively, the attachment position error measuring function unit 1201 further determines the reference axis $z_w$ of the user on the coordinate system xyz of the head action tracking device 200 based on a gravity vector obtained at the timing of the stationary state of the user facing obliquely above, i.e., the vector $G_F{'}$ corresponding to the frontward and obliquely upward vector $G_{SP}$ projected on the plane $S_G$ perpendicular to the upward vector $G_G$.

The attachment position error measuring function unit 1201 determines the $x_w$ axis based on outer product calculation of the $y_w$ and $z_w$, and calculates the transformation matrix M by using Formula (1) through (3) mentioned above. The transformation matrix M corresponds to a correction coefficient for correcting an attachment position error of the head action tracking device 200.

An attachment position error absorbing unit 1202 corrects an attachment position error by multiplying the rotation matrix $M_R$, which has been calculated by the posture angle calculation unit 202, by the transformation matrix M. The attachment position error absorbing unit 1202 transmits the corrected rotation matrix $M_R \times M$ to the image drawing device 300 via the transmission unit 203.

For correcting an attachment position error of the head action tracking device 200 by the foregoing method, the user is required to face the front, above, or obliquely above. For example, a message such as "look front", and "look up (or obliquely up)" may be displayed on the display unit 402 of the display device 400, or generated as an audio message to urge the user to take a necessary action for measurement. In this case, the display device 400 notifies the head action tracking device 200 about the timing of display of the respective messages via the image drawing device 300, for example, to synchronize the display with the measurement timing of the gravity vector. The attachment position error measuring unit 1201 of the head action tracking device 200 obtains the upward vector $G_G$, the frontward vector $G_F$, or the frontward and obliquely upward vector $G_{SF}$ in response to the notification about display of the respective messages.

Figure 13:
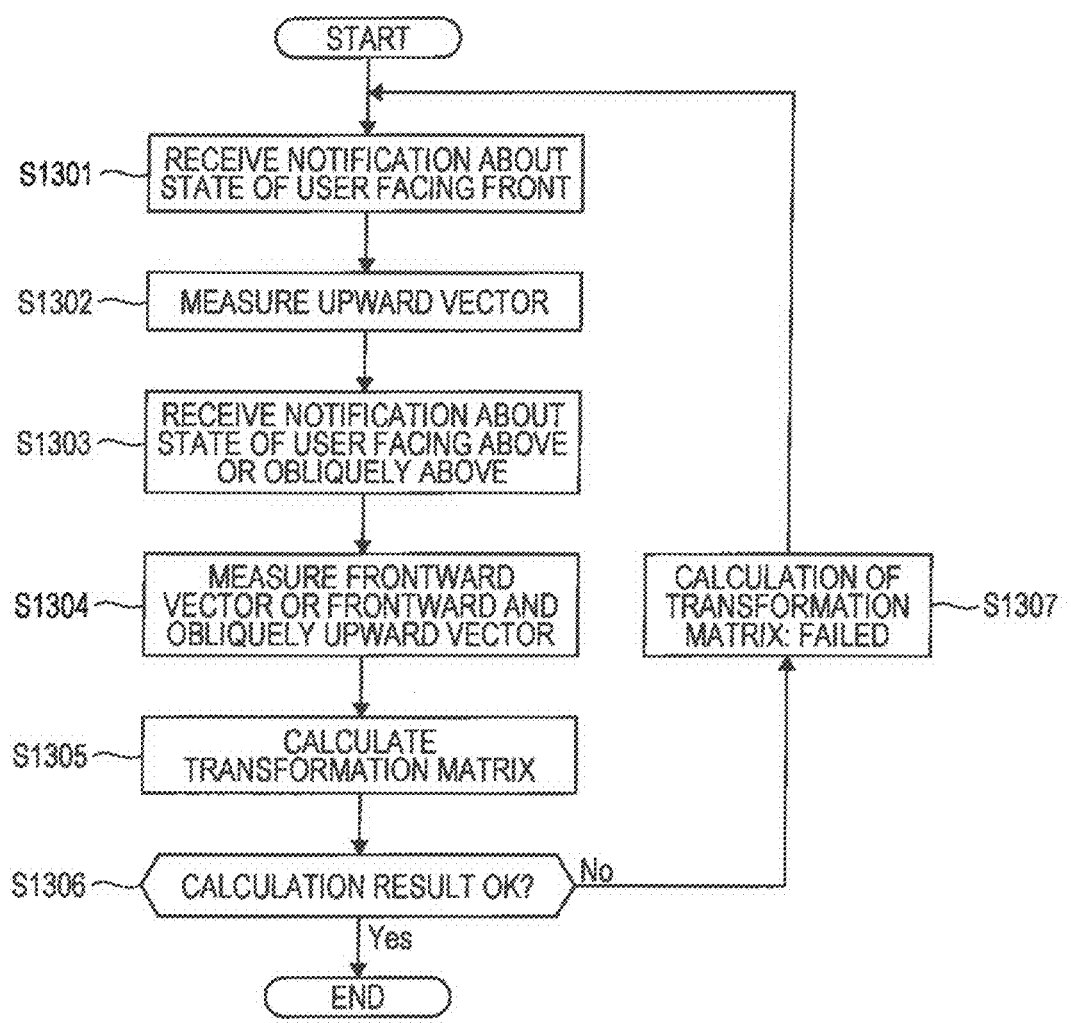
FIG. 13 is a flowchart showing procedures of a process for calculating a correction coefficient for correcting an attachment position error of the head action tracking device 200 by using the configuration of the head action tracking device 200 illustrated in FIG. 12.

FIG. 13 shows procedures of a process in the form of a flowchart for calculating a correction coefficient for correcting an attachment position error of the head action tracking device 200 by using the configuration of the head action tracking device 200 illustrated in FIG. 12.

The display device 400 issues an instruction for urging the user to face the front by displaying a message or outputting a voice message, such as "look front", for example, and notifies the head action tracking device 200 about the issue of the instruction (step S1301).

The attachment position error measuring unit 1201 of the head action tracking device 200 measures the upward vector $G_G$ in response to the notification of display of the message from the display device 400 (step S1302). For example, when the gravity vector output from the sensor unit 201 is stabilized, the attachment position error measuring unit 1201 determines that the user is in a stationary state facing the front, and measures the upward vector $G_G$. Alternatively, when operation is input from the user to the image drawing device 300 or the display device 400 to indicate that the user is in a stationary state facing the front, this operation is transmitted to the head action tracking device 200 as notification. The attachment position error measuring unit 1201 thus notified measures the upward vector $G_G$.

The display device 400 subsequently issues an instruction for urging the user to face above (or obliquely above) by displaying a message or outputting a voice message, such as "look up (or obliquely up)", and notifies the head action tracking device 200 about the issue of the instruction (step S1303).

The attachment position error measuring unit 1201 of the head action tracking device 200 measures the frontward vector $G_F$ or the frontward and obliquely upward vector $G_{SF}$ in response to the notification of display of the message from the display device 400 (step S1304). For example, when the gravity vector output from the sensor unit 201 is stabilized, the attachment position error measuring unit 1201 determines that the user is in a stationary state facing above (or obliquely above), and measures the frontward vector $G_F$ or the frontward and obliquely upward vector $G_{SF}$. Alternatively, when operation is input from the user to the image drawing device 300 or the display device 400 to indicate that the user is in a stationary state facing above (or obliquely above), this operation is transmitted to the head action tracking device 200 as notification. The attachment position error measuring unit 1201 thus notified measures the frontward vector $G_F$ or the frontward and obliquely upward vector $G_{SF}$.

The attachment position error measuring function unit 1201 determines the $x_w$ axis by outer product calculation of the $y_w$ axis determined based on the upward vector $G_G$ and the $z_w$ axis determined based on the frontward vector $G_F$ or the frontward and obliquely upward vector $G_{SF}$, and calculates the transformation matrix M corresponding to a correction coefficient for correcting the attachment position error by using Formulas (1) through (3) mentioned above (step S1305).

In step S1306, it is checked that the calculation result does not become an error. When the frontward and obliquely upward vector $G_{SF}$ is measured in steps SS1303 and S1304, for example, it is checked whether or not an angle formed by the two vectors $G_G$ and $G_{SF}$ is sufficiently large (30 degrees or larger, for example), and whether or not correct calculation has been performed.

When the check in step S1306 succeeds, the result calculated in step S1305 is output to end the routine of this process.

When the check in step S1306 fails, the display device 400 presents a message to the user to indicate that calculation of the correction coefficient has failed (step S1307). Then, the flow returns to step S1301 to repeat the process for obtaining the correction coefficient.

The process for calculating the transformation matrix M in steps S1301 through S1305 may be repeated a predetermined number of times to increase calculation accuracy. In this case, it is checked whether or not the number of times of execution of the process has reached the predetermined number of times in step S1306. When the number of times of execution of the process is smaller than the predetermined number of times, it is determined that the check has failed. In this case, the flow returns to step S1301. In case of repetition of the process several times, the user may face in other directions as well as the two directions of the front and the directly above or obliquely above to increase calculation accuracy.

Figure 14:
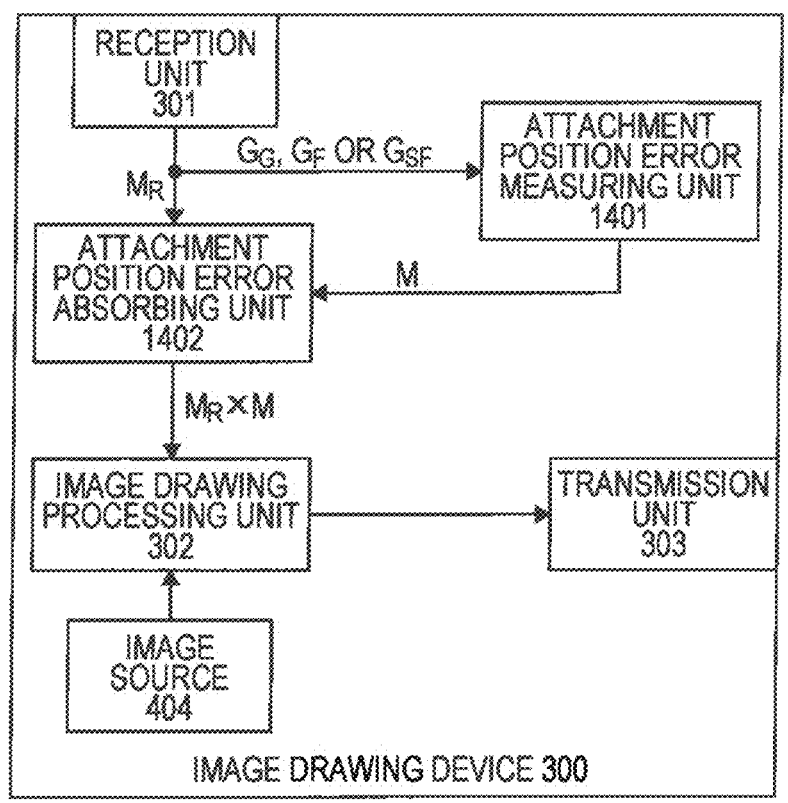
FIG. 14 is a view schematically illustrating a functional configuration of an image drawing device 300 including an attachment posit ion error measuring function and an attachment position error absorbing function.

FIG. 14 schematically illustrates a functional configuration of the image drawing device 300 including the attachment position error measuring function and the attachment position error absorbing function.

The reception unit 301 receives the rotation matrix $M_R$ indicating posture information of a posture of the head of the user, and information about a gravity vector measured by the sensor unit 201, both sets of information transmitted from the head action tracking device 200.

An attachment position error measuring function unit 1401 monitors a gravity vector received by the reception unit 301.

The attachment position error measuring function unit 1401 determines the reference axis $y_w$ of the user on the coordinate system xyz of the head action tracking device 200 based on a gravity vector obtained at the timing of the stationary state of the user facing the front, i.e., the upward vector $G_G$.

The attachment position error measuring function unit 1401 further determines the reference axis $z_w$ of the user on the coordinate system xyz of the head action tracking device 200 based on a gravity vector obtained at the timing of the stationary state of the user facing above, i.e., the upward vector $G_F$. Alternatively, the attachment position error measuring function unit 1401 further determines the reference axis $z_w$ of the user on the coordinate system xyz of the head action tracking device 200 based on a gravity vector obtained at the timing of the stationary state of the user facing obliquely above, i.e., the vector $G_F'$ corresponding to the frontward and obliquely upward vector $G_{SF}$ projected on the plane $S_G$ perpendicular to the upward vector $G_G$.

The attachment position error measuring function unit 1401 determines the $x_w$ axis based on outer product calculation of the $y_w$ and $z_w$, and calculates the transformation matrix M by using Formulas (1) through (3) mentioned above. The transformation matrix M corresponds to a correction coefficient for correcting an attachment position error of the head action tracking device 200.

An attachment position error absorbing unit 1402 corrects an attachment position error by multiplying the rotation matrix $M_R$, which has been received from the head action tracking device via the reception unit 301, by the transformation matrix M. The attachment position error absorbing unit 1402 transmits the corrected rotation matrix $M_R \times M$ to the image drawing processing unit 302.

The image drawing processing unit 302 receives a wide-view-angle original image, such as an omnidirectional original image and 4K image, from the image source 304, and renders an image cut from the original image at a display angle of view corresponding to posture information corrected by the attachment position error absorbing unit 1402.

For correcting an attachment position error of the head action tracking device 200 by the foregoing method, the user is required to face the front, above, or obliquely above. For example, the image drawing device 300 may instruct the display device 400 to display a message, or generate a voice message, such as "look front", and "look up (or obliquely up)", to urge the user to take a necessary action for measurement. In this case, the attachment position error measuring unit 1401 of the image drawing device 300 having received a gravity vector from the head action tracking device 300 may obtain the upward vector $G_G$, the frontward vector $G_F$, or the frontward and obliquely upward vector $G_{SF}$ from the gravity vector in synchronization with the timing for displaying the message on the display device 400.

Figure 15:
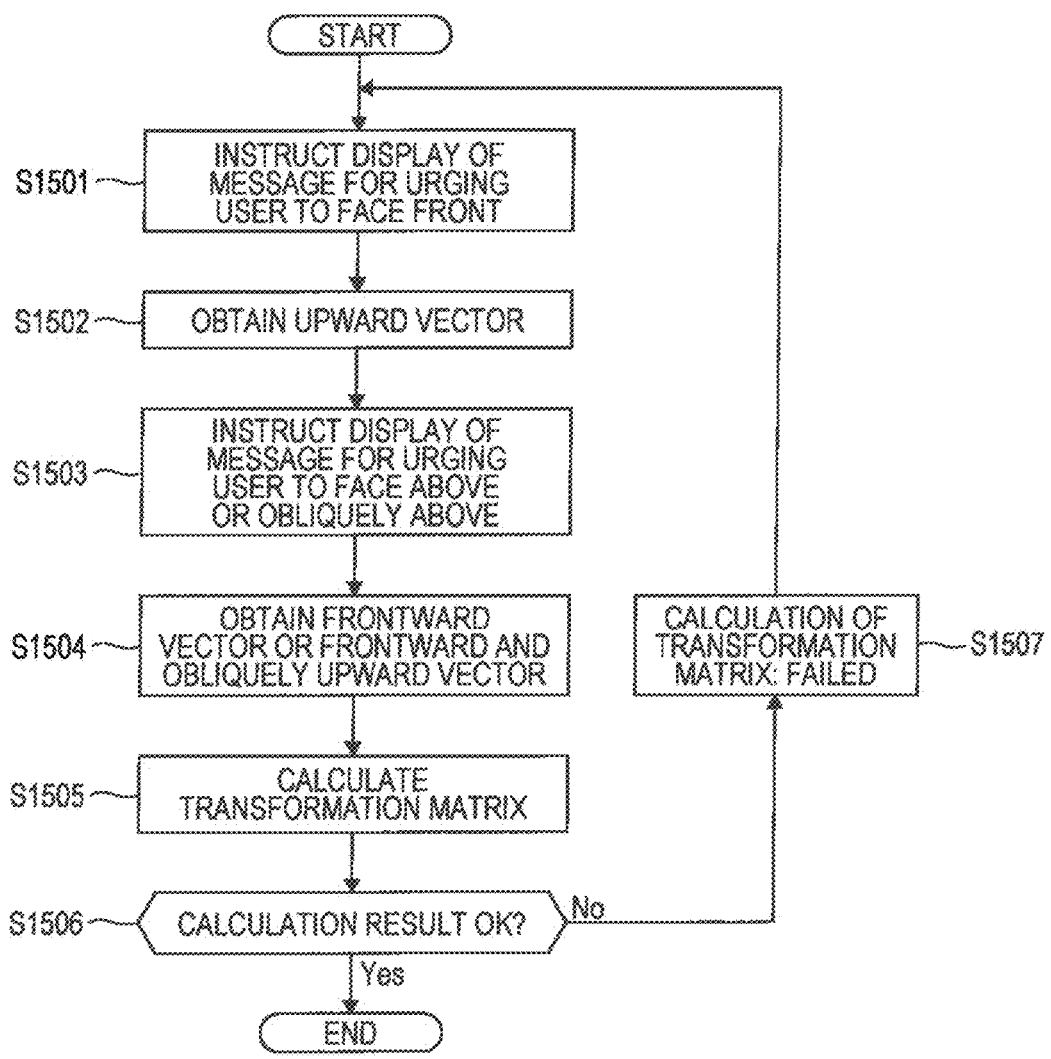
FIG. 15 is a flowchart showing procedures of a process for calculating a correction coefficient for correcting an attachment position error of the head action tracking device 200 by using the configuration of the image drawing device 300 illustrated in FIG. 14.

FIG. 15 shows procedures of a process in the form of a flowchart for calculating a correction coefficient for correcting an attachment position error of the head action tracking device 200 by using the configuration of the image drawing device 300 illustrated in FIG. 14.

The image drawing device 300 instructs the display device 400 to display a message or output a voice message for urging the user to face the front, such as "look front" (step S1501).

The attachment position error measuring unit 1401 included in the image drawing device 300 having received the gravity vector from the head action tracking device 200, i.e., the upward vector $G_G$, determines the $y_w$ axis as the reference axis of the user on the coordinate system xyz of the head action tracking device 200 based on the upward vector $G_G$ in synchronization with the timing for displaying the message by the display device 400 (step S1502).

The image drawing device 300 further instructs the display device 400 to display a message or output a voice message for urging the user to face above (or obliquely above), such as "look up (or obliquely up)" (step S1503).

The attachment position error measuring unit 1401 included in the image drawing device 300 having received the gravity vector from the head action tracking device 200, i.e., the frontward vector $G_F$ or the frontward and obliquely upward vector $G_{SF}$, determines the $z_w$ axis as the reference axis of the user on the coordinate system xyz of the head action tracking device 200 based on the frontward vector $G_F$ or the frontward and obliquely upward vector $G_{SF}$ in synchronization with the timing for displaying the message by the display device 400 (step S1504).

The attachment position error measuring function unit 1401 subsequently determines the $x_w$ axis based on outer product calculation of the $y_w$ axis determined in step S1502 and the $z_w$ axis determined in step S1504, and calculates the transformation matrix M corresponding to a correction coefficient for correcting the attachment position error by using Formulas (1) through (3) mentioned above (step S1505).

In step S1506, it is checked that the calculation result does not become an error. When the frontward and obliquely upward vector G p is obtained in steps SS1503 and S1504, for example, it is checked whether or not an angle formed by the two vectors $G_G$ and $G_{SF}$ is sufficiently large (30 degrees or larger, for example), and whether or not correct calculation has been performed.

When the check in step S1506 succeeds, the result calculated in step S1305 is output to end the routine of this process.

When the check in step S1506 fails, the display device 400 presents a message to the user to indicate that calculation of the correction coefficient has failed (step S1507). Then, the flow returns to step S1501 to repeat the process for obtaining the correction coefficient.

The process for calculating the transformation matrix M in steps S1501 through S1505 may be repeated a predetermined number of times to increase calculation accuracy. In this case, it is checked whether or not the number of times of execution of the process has reached the predetermined number of times in step S1506. When the number of times of execution of the process is smaller than the predetermined number of times, it is determined that the check has failed. In this case, the flow returns to step S1501. In case of repetition of the process several times, the user may face in other directions as well as the two directions of the front and the directly above or obliquely above to increase calculation accuracy.

Figure 16:
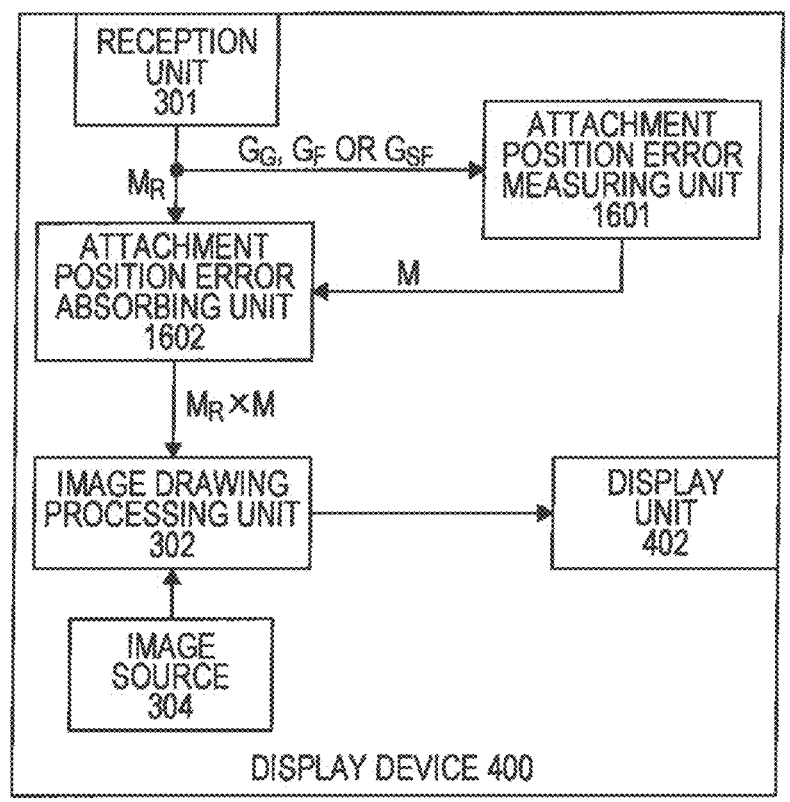
FIG. 16 is a view schematically illustrating a functional configuration provided within the display device 400 of the image display system 100 illustrated in FIG. 2, which functional configuration includes an attachment position error measuring function and an attachment position error absorbing function.

FIG. 16 schematically illustrates a functional configuration of the display device 400 of the image display system 100 illustrated in FIG. 2, including the attachment position error measuring function and the attachment position error absorbing function.

The reception unit 301 receives the rotation matrix $M_R$ indicating posture information of a posture of the head of the user, and information about a gravity vector measured by the sensor unit 201, both sets of information transmitted from the head action tracking device 200.

An attachment position error measuring function unit 1601 monitors a gravity vector received by the reception unit 301.

The attachment position error measuring function unit 1601 determines the reference axis $y_w$ of the user on the coordinate system xyz of the head action tracking device 200 based on a gravity vector obtained at the timing of the stationary state of the user facing the front, i.e., the upward vector $G_G$.

The attachment position error measuring function unit 1601 further determines the reference axis $z_w$ of the user on the coordinate system xyz of the head action tracking device 200 based on a gravity vector obtained at the timing of the stationary state of the user facing above, i.e., the frontward vector $G_F$. Alternatively, the attachment position error measuring function unit 1601 further determines the reference axis $z_w$ of the user on the coordinate system xyz of the head action tracking device 200 based on a gravity vector obtained at the timing of the stationary state of the user facing obliquely above, i.e., the vector $G_F'$ corresponding to the frontward and obliquely upward vector $G_{SF}$ projected on the plane $S_G$ perpendicular to the upward vector $G_G$.

The attachment position error measuring function unit 1601 determines the $x_w$ axis based on outer product calculation of the $y_w$ and $z_w$, and calculates the transformation matrix M by using Formulas (1) through (3) mentioned above. The transformation matrix M corresponds to a correction coefficient for correcting an attachment position error of the head action tracking device 200.

An attachment position error absorbing unit 1602 corrects an attachment position error by multiplying the rotation matrix $M_R$, which has been received from the head action tracking device via the reception unit 301, by the transformation matrix M. The attachment position error absorbing unit 1602 transmits the corrected rotation matrix $M_R \times M$ to the image drawing processing unit 302.

The image drawing processing unit 302 receives a wide-view-angle original image, such as an omnidirectional original image and 4K image, from the image source 304, and renders an image cut from the original image at a display angle of view corresponding to posture information corrected by the attachment position error absorbing unit 1602. The display unit 402 displays the rendered image at the display angle.

For correcting an attachment position error of the head action tracking device 200 by the foregoing method, the user is required to face the front, above, or obliquely above. For example, the display device 400 may display a message, or generate a voice message, such as "look front", and "look up (or obliquely up)", to urge the user to take a necessary action for measurement. In this case, the attachment position error measuring unit 1601 included in the display device 400 having received the gravity vector received from the head action tracking device 300 may obtain the upward vector $G_G$, the frontward vector $G_F$, or the frontward and obliquely upward vector $G_{SF}$ from the gravity vector in synchronization with the timing for displaying the message on the display device 400.

Figure 17:
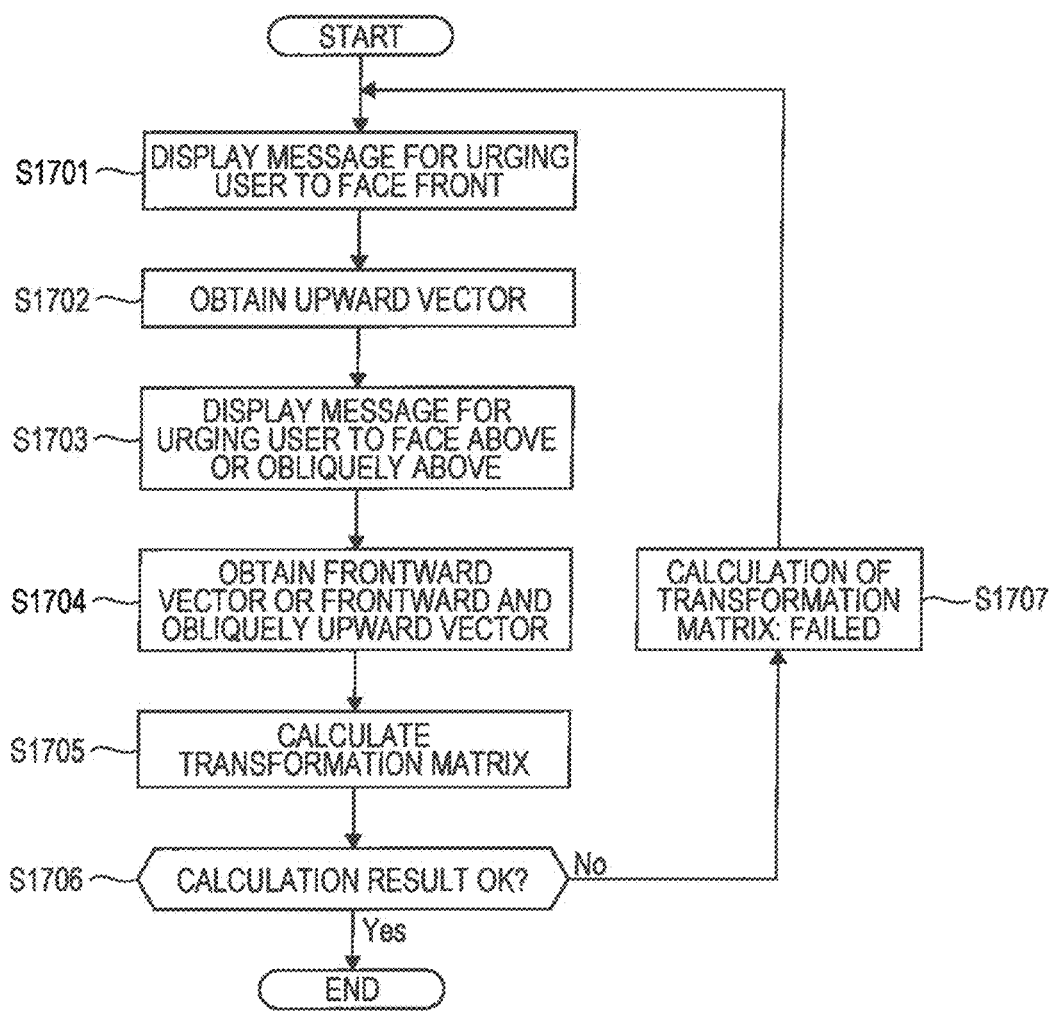
FIG. 17 is a flowchart showing procedures of a process for calculating a correction coefficient for correcting an attachment position error of the head action tracking device 200 by using the configuration of the display device 400 illustrated in FIG. 16.

FIG. 17 shows procedures of a process in the form of a flowchart for calculating a correction coefficient for correcting an attachment position error of the head action tracking device 200 by using the configuration of the display device 400 illustrated in FIG. 16.

The display device 400 displays a message or outputs a voice message for urging the user to face the front, such as "look front" (step S1701).

The attachment position error measuring unit 1601 included in the display device 400 having received the gravity vector from the head action tracking device 200, i.e., the upward vector $G_G$, determines the $y_w$ axis as the reference axis of the user on the coordinate system xyz of the head action tracking device 200 based on the upward vector $G_G$ in synchronization with the timing for displaying the message (step S1702).

The display device 400 further displays a message or outputs a voice message for urging the user to face above (or obliquely above), such as "look up (or obliquely up)" (step S1703).

The attachment position error measuring unit 1601 included in the display device 400 having received the gravity vector received from the head action tracking device 200, i.e., the frontward vector $G_F$ or the frontward and obliquely upward vector $G_{SF}$, determines the $z_w$ axis as the reference axis of the user on the coordinate system xyz of the head action tracking device 200 based on the frontward vector $G_F$ or the frontward and obliquely upward vector $G_{SF}$ in synchronization with display of the message (step S1704).

The attachment position error measuring unit 1601 subsequently determines the $x_w$ axis based on outer product calculation of the $y_w$ axis determined in step S1702 and the $z_w$ axis determined in step S1704, and calculates the transformation matrix M corresponding to a correction coefficient for correcting the attachment position error by using Formulas (1) through (3) mentioned above (step S1705).

In step S1706, it is checked that the calculation result does not become an error. When the frontward and obliquely upward vector $G_{SF}$ is obtained in steps SS1703 and 81704, for example, it is checked whether or not an angle formed by the two vectors $G_G$ and $G_{SF}$ is sufficiently large (30 degrees or larger, for example), and whether or not correct calculation has been performed.

When the check in step S1706 succeeds, the result calculated in step S1305 is output to end the routine of this process.

When the check in step S1706 fails, the display device 400 presents a message to the user to indicate that calculation of the correction coefficient has failed (step S1707). Then, the flow returns to step S1701 to repeat the process for obtaining the correction coefficient.

The process for calculating the transformation matrix M in steps S1701 through S1705 may be repeated a predetermined number of times to increase calculation accuracy. In this case, it is checked whether or not the number of times of execution of the process has reached the predetermined number of times in step S1706. When the number of times of execution of the process is smaller than the predetermined number of times, it is determined that the check has failed. In this case, the flow returns to step S1701. In case of repetition of the process several times, the user may face in other directions as well as the two directions of the front and the directly above or obliquely above to increase calculation accuracy.

As described above, the image display system 100 according to this embodiment is capable of correcting an attachment position error of the head action tracking device 200 in a manner easy for the user.

For measuring the attachment position error of the head action tracking device 200 of the image display system 100, the user is only required to take two postures in two directions for facing the front, and facing directly above or obliquely above. The posture for facing the front is easy for the user. The posture for facing directly above is difficult, but the posture for facing obliquely above is easy for the user. No strict limitation is imposed on the posture of the user for facing obliquely above.

According to this embodiment, the image display system 100 measures an attachment position error of the head action tracking device 200, and performs attachment position error correction for posture information measured by the head action tracking device 200. This structure eliminates the necessity of accurate fixation between the head action tracking device 200 and the body of the display device 400, and therefore increases precision of posture information even when the head action tracking device 200 is handled like an accessory component attached to the display device 400 for each time of use.

CITATION LIST

Patent Documents

Patent Document 1: Japanese Patent Application Laid-Open No. 2012-141461
Patent Document 2: Japanese Patent Application Laid-Open No. 9-106322
Patent Document 3: Japanese Patent Application Laid-Open No. 2010-256534

INDUSTRIAL APPLICABILITY

The technology disclosed in the present specification has been described in detail with reference to a specific embodiment. However, it should be understood as an obvious matter that modifications and substitutions may be made concerning this embodiment by those skilled in the art without departing from the scope of the subject matters of the technology disclosed in the present specification.

The technology disclosed in the present specification is particularly effective when the head action tracking device 200 is provided as an optional product attached outside the display device 400 constituted by a head mount display. However, as a matter of course, the technology disclosed in the present specification is applicable to a structure which accommodates the head action tracking device 200 within the body 41 of the display device 400. Moreover, the technology disclosed in the specification is applicable to a structure which constitutes the display device 400 by a product other than a head mount display in reproducing an image following a motion of the head of the user.

Accordingly, it is not intended that the technology disclosed in the present specification be limited to the contents described in the present specification presented only by way of example. The subject matters of the technology disclosed in the present specification should be defined only by the appended claims.

The technology disclosed in the present specification may have the following configurations.

(1)

A posture measuring device including:

a sensor unit that detects a posture;

an attachment position error measuring unit that measures an attachment position error of the sensor unit;

an attachment position error absorbing unit that corrects, based on the attachment position error, posture information detected by the sensor unit; and a transmission unit that transmits the corrected posture information to an external device.

(2)

The posture measuring device according to (1) noted above, wherein the posture measuring device is attached to the head of a user at the time of use, the sensor unit detects a posture of the head, the attachment position error measuring unit measures deviation of a reference axis of the sensor unit from a reference axis of the user, and the attachment position error absorbing unit corrects, based on the deviation, the posture information detected by the sensor unit.

(3)

The posture measuring device according to (1) or (2) noted above, wherein the posture measuring device is attached to the head of a user at the time of use, and the transmission unit transmits the corrected posture information to the external device that renders an image following a motion of the head of the user.

(4)

The posture measuring device according to (2) noted above, wherein the sensor unit is capable of detecting a gravity vector, and the attachment position error measuring unit measures the attachment position error based on gravity vectors detected for two postures of the user.

(5)

The posture measuring device according to (4) noted above, wherein the attachment position error measuring unit determines a $y_w$ axis corresponding to a reference axis of the user with respect to reference axes x, y, and z of the sensor unit based on a gravity vector $G_G$ detected when the user faces the front, determines a $z_w$ axis corresponding to a reference axis of the user with respect to the reference axes x, y, and z of the sensor based on a gravity vector $G_F$ detected when the user faces directly above or a gravity vector $G_{SF}$ detected when the user faces obliquely above, determines an $x_w$ axis corresponding to a reference axis of the user based on outer product calculation of the $y_w$ axis and the $z_w$ axis, and calculates a transformation matrix M based on a relationship between the reference axes x, y, and z of the sensor and the reference axes $x_w$, $y_w$, and $z_w$ of the user, and the attachment position error absorbing unit multiplies a rotation matrix $M_R$ by the transformation matrix M, the rotation matrix $M_R$ indicating the posture information detected by the sensor unit, then corrects the attachment position error.

(6)

The posture measuring device according to (5) noted above, wherein the attachment position error measuring unit measures the gravity vector $G_G$ in response to display or voice output of a message from the display device for urging the user to face the front, and measures the gravity vector $G_F$ or $G_{SF}$ in response to display or voice output of a message from the display device for urging the user to face directly above or obliquely above.

(7)

A posture measuring method including:

an attachment position error measuring step that measures an attachment position error of a sensor unit which detects a posture;

an attachment position error absorbing step that corrects, based on the attachment position error, posture information detected by the sensor unit; and a transmission step that transmits the corrected posture information to an external device.

(8)

An image processing device including:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a transmission unit that transmits the image processed by the image drawing processing unit to a display device.

(9)

The image processing device according to (8) noted above, wherein the image drawing processing unit renders, based on the posture information, an image following a motion of the head of the user.

(10)

The image processing device according to (8) or (9) noted above, wherein the attachment position error measuring unit measures deviation of a reference axis of the head action tracking device from a reference axis of the user, and the attachment position error absorbing unit corrects, based on the deviation, posture information received from the head action tracking device.

(11)

The image processing device according to any one of (8) through (10) noted above, wherein the attachment position error measuring unit measures the attachment position error based on gravity vectors received for two postures of the user from the head action tracking device.

(12)

The image processing device according to (11) noted above, wherein the attachment position error measuring unit determines a $y_w$ axis corresponding to a reference axis of the user with respect to reference axes x, y, and z of the sensor unit based on a gravity vector $G_G$ detected when the user faces the front, determines a $z_w$ axis corresponding to a reference axis of the user with respect to the reference axes x, y, and z of the sensor based on a gravity vector $G_F$ detected when the user faces directly above or a gravity vector $G_{SF}$ detected when the user faces obliquely above, determines an $x_w$ axis corresponding to a reference axis of the user based on outer product calculation of the $y_w$ axis and the $z_w$ axis, and calculates a transformation matrix M based on a relationship between the reference axes x, y, and z of the sensor and the reference axes $x_w$, $y_w$, and $z_w$ of the user, and the attachment position error absorbing unit multiplies a rotation matrix $M_R$ by the transformation matrix M, the rotation matrix $M_R$ indicating the posture information detected by the sensor unit, then corrects the attachment position error.

(13)

The image processing device according to (12) noted above, wherein the attachment position error measuring unit measures the gravity vector $G_G$ in response to display or voice output of a message from the display device for urging the user to face the front, and measures the gravity vector $G_F$ or $G_{SF}$ in response to display or voice output of a message from the display device for urging the user to face directly above or obliquely above.

(14)

An image processing method including:

a reception step that receives information containing posture information about a posture of the head of a user from a head action tracking device attached to the head of the user;

an attachment position error measuring step that measures an attachment position error of the head action tracking device;

an attachment position error absorbing step that corrects, based on the attachment position error, posture information received from the head action tracking device;

an image drawing processing step that processes an image based on the corrected posture information; and a transmission step that transmits the image processed by the image drawing processing unit to a display device.

(15)

A display device including:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a display unit that displays an image processed by the image drawing processing unit.

(16)

The display device according to (15) noted above, wherein a display screen of the display unit is fixed to the head or face of the user at the time of use.

(17)

The display device according to (15) or (16) noted above, wherein the image drawing processing unit renders, based on the posture information, an image following a motion of the head of the user.

(18)

The display device according to any one of (15) through (17) noted above, wherein the attachment position error measuring unit measures deviation of a reference axis of the head action tracking device from a reference axis of the user, and the attachment position error absorbing unit corrects, based on the deviation, posture information received from the head action tracking device.

(19)

The display device according to (18) noted above, wherein the attachment position error measuring unit measures the attachment position error based on gravity vectors received for two postures of the user from the head action tracking device.

(20)

The display device according to (19) noted above, wherein the attachment position error measuring unit determines a $y_w$ axis corresponding to a reference axis of the user with respect to reference axes x, y, and z of the sensor unit based on a gravity vector $G_G$ detected when the user faces the front, determines a $z_w$ axis corresponding to a reference axis of the user with respect to the reference axes x, y, and z of the sensor based on a gravity vector $G_F$ detected when the user faces directly above or a gravity vector $G_{SF}$ detected when the user faces obliquely above, determines an $x_w$ axis corresponding to a reference axis of the user based on outer product calculation of the $y_w$ axis and the $z_w$ axis, and calculates a transformation matrix M based on a relationship between the reference axes x, y, and z of the sensor and the reference axes $x_w$, $y_w$, and $z_w$ of the user, and the attachment position error absorbing unit multiplies a rotation matrix $M_R$ by the transformation matrix M, the rotation matrix $M_R$ indicating the posture information detected by the sensor unit, then corrects the attachment position error.

(21)

The display device according to (20) noted above, wherein the attachment position error measuring unit measures the gravity vector $G_G$ in response to display or voice output of a message from the display device for urging the user to face the front, and measures the gravity vector $G_F$ or $G_{SF}$ in response to display or voice output of a message from the display device for urging the user to face directly above or obliquely above.

(22)

A computer program described in a computer-readable format, under the program a computer performs functions of:

an attachment position error measuring unit that measures an attachment position error of a sensor unit which detects a posture;

an attachment position error absorbing unit that corrects, based on the attachment position error, posture information detected by the sensor unit; and a transmission unit that transmits the corrected posture information to an external device.

(23)

A computer program described in a computer-readable format, under the program a computer performs functions of:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a transmission unit that transmits the image processed by the image drawing processing unit to a display device.

(24)

A computer program described in a computer-readable format, under the program a computer performs functions of:

a reception unit that receives information containing posture information about a posture of the head of a user from a head action tracking device attached to the head of the user;

an attachment position error measuring unit that measures an attachment position error of the head action tracking device;

an attachment position error absorbing unit that corrects, based on the attachment position error, posture information received from the head action tracking device;

an image drawing processing unit that processes an image based on the corrected posture information; and a display unit that displays an image processed by the image drawing processing unit.

(25)

An image display system including:

a head action tracking device that measures a posture of the head of a user;

an attachment position error measuring function that measures an attachment position error of the head action tracking device;

an attachment position error absorbing function that corrects, based on the attachment position error, posture information measured by the head action tracking device;

an image drawing device that renders an image based on the corrected posture information; and a display device that displays an image rendered by the image drawing device.

REFERENCE SIGNS LIST

41 Body
42 Forehead rest
43 Nose pad
44 Upper band
45 Lower band
100 Image display system
200 Head action tracking device
201 Sensor unit
202 Posture angle calculation unit
203 Transmission unit
300 Image drawing device
301 Reception unit
302 Image drawing processing unit
303 Transmission unit
304 Image source
400 Display device
401 Reception unit
402 Display unit

The invention claimed is:

1. A posture measuring device, comprising:
a tracking unit configured to:
  detect posture information of a user; and
  measure a first gravity vector based on the detected posture information of the user, wherein the detected posture information indicates that a posture of the user is in a stationary state;
an attachment position error measuring unit configured to:
  determine a first reference axis of the user based on the measured first gravity vector; and
  measure a deviation of a second reference axis of the tracking unit from the determined first reference axis of the user;
an attachment position error absorbing unit configured to correct the detected posture information based on the measured deviation; and
a transmission unit configured to transmit the corrected posture information to an external device.

2. The posture measuring device according to claim 1,
wherein the posture measuring device is mountable on a head of the user, and
wherein the tracking unit is further configured to detect a posture of the head.

3. The posture measuring device according to claim 2,
wherein the tracking unit is further configured to measure a plurality of gravity vectors that corresponds to a plurality of postures of the head of the user,
wherein the plurality of gravity vectors includes the first gravity vector, and
wherein the attachment position error measuring unit is further configured to measure an error based on the measured plurality of gravity vectors.

4. The posture measuring device according to claim 3,
wherein the attachment position error measuring unit is further configured to:
  determine a first plurality of reference axes of the user with respect to a second plurality of reference axes x, y, z of the tracking unit,
    wherein the second plurality of reference axes includes the second reference axis of the tracking unit;
  determine a $y_w$ axis of the first plurality of reference axes of the user with respect to the second plurality of reference axes of the tracking unit based on a gravity vector $G_G$ of the plurality of gravity vectors,
    wherein the gravity vector $G_G$ is measured based on the user that faces front in a horizontal direction with respect to the user,
    wherein the first reference axis corresponds to the $y_w$ axis, and
    wherein the first gravity vector corresponds to the gravity vector $G_G$;
  determine a $z_w$ axis of the first plurality of reference axes of the user with respect to the second plurality of reference axes of the tracking unit based on one of a gravity vector $G_F$ of the plurality of gravity vectors or a gravity vector $G_{SF}$ of the plurality of gravity vectors,
    wherein the gravity vector $G_F$ is measured based on the user that faces directly above in a vertical direction with respect to the user, and
    wherein the gravity vector $G_{SF}$ is measured based on the user that faces obliquely above with respect to the vertical direction;

determine an $x_w$ axis of the first plurality of reference axes of the user based on outer product calculation of the $y_w$ axis and the $z_w$ axis; and calculate a transformation matrix M based on a relationship between the second plurality of reference axes x, y, and z of the tracking unit and the first plurality of reference axes $x_w$, $y_w$, and $z_w$ of the user, wherein the attachment position error absorbing unit is further configured to correct the detected posture information by multiplication of a rotation matrix $M_R$ and the transformation matrix M, and wherein the rotation matrix $M_R$ indicates the detected posture information.

5. The posture measuring device according to claim 4, wherein the attachment position error measuring unit is further configured to:

measure the gravity vector $G_G$ based on a reception of a first message for the user to face the front in the horizontal direction with respect to the user; and measure one of the gravity vector $G_F$ based on a reception of a second message for the user to face directly above or the gravity vector $G_{SF}$ based on a reception of a third message for the user to face obliquely above, and wherein the first message, the second message, and the third message are one of displayed on a display device or a voice output from the display device.

6. The posture measuring device according to claim 1, wherein the posture measuring device is mountable on a head of the user, and wherein the external device renders an image that follows a motion of the head.

7. A posture measuring method, comprising:

detecting, by a tracking unit, posture information of a user;

measuring, by the tracking unit, a gravity vector based on the detected posture information of the user, wherein the detected posture information indicates that a posture of the user is in a stationary state;

determining, by an attachment position error measuring unit, a first reference axis of the user based on the measured gravity vector;

measuring, by the attachment position error measuring unit, a deviation of a second reference axis of the tracking unit from the determined first reference axis of the user;

correcting, by an attachment position error absorbing unit, the detected posture information based on the measured deviation; and transmitting, by a transmission unit, the corrected posture information to an external device.

8. An image processing device, comprising:

a reception unit configured to receive posture information of a head of a user from a tracking unit,
 wherein the tracking unit is mountable on the head of the user, and
 wherein the tracking unit:
 detects the posture information; and
 measures a first gravity vector based on the detected posture information of the user,
 wherein the detected posture information indicates that a posture of the user is in a stationary state;

an attachment position error measuring unit configured to:
 determine a first reference axis of the user based on the measured first gravity vector; and
 measure a deviation of a second reference axis of the tracking unit from the determined first reference axis of the user;

an attachment position error absorbing unit configured to correct the received posture information based on the measured deviation;

an image drawing processing unit configured to process an image based on the corrected posture information; and a transmission unit configured to transmit the processed image to a display device.

9. The image processing device according to claim 8, wherein the image drawing processing unit is further configured to render, based on the posture information, an image that follows a motion of the head of the user.

10. The image processing device according to claim 8, wherein:

the reception unit is further configured to receive a plurality of gravity vectors from the tracking unit,
 wherein the plurality of gravity vectors corresponds to a plurality of postures of the user, and
 wherein the plurality of gravity vectors includes the first gravity vector; and the attachment position error measuring unit is further configured to measure the deviation based on the received plurality of gravity vectors.

11. The image processing device according to claim 10, wherein the attachment position error measuring unit is further configured to:

determine a first plurality of reference axes of the user with respect to a second plurality of reference axes x, y, z of the tracking unit,
 wherein the second plurality of reference axes includes the second reference axis of the tracking unit;

determine a $y_w$ axis of the first plurality of reference axes of the user with respect to the second plurality of reference axes of the tracking unit based on a gravity vector $G_G$ of the plurality of gravity vectors,
 wherein the gravity vector $G_G$ is measured based on the user faces front in a horizontal direction with respect to the user,
 wherein the first reference axis corresponds to the $y_w$ axis, and
 wherein the first gravity vector corresponds to the gravity vector $G_G$;

determine a $z_w$ axis of the first plurality of reference axes of the user with respect to the second plurality of reference axes of the tracking unit based on one of a gravity vector $G_F$ of the plurality of gravity vectors or a gravity vector $G_{SF}$ of the plurality of gravity vectors,
 wherein the gravity vector $G_F$ is measured based on the user that faces directly above in a vertical direction with respect to the user, and
 wherein the gravity vector $G_{SF}$ is measured based on the user that faces obliquely above with respect to the vertical direction;

determine an $x_w$ axis of the first plurality of reference axes of the user based on outer product calculation of the $y_w$ axis and the $z_w$ axis; and calculate a transformation matrix M based on a relationship between the second plurality of reference axes x, y, and z of the tracking unit and the first plurality of reference axes $x_w$, $y_w$, and $z_w$ of the user, wherein the attachment position error absorbing unit is further configured to correct the received posture information by multiplication of a rotation matrix $M_R$ and the transformation matrix M, and wherein the rotation matrix $M_R$ indicates the detected posture information.

12. The image processing device according to claim 11, wherein the attachment position error measuring unit is further configured to:

measure the gravity vector $G_G$ based on a reception of a first message for the user to face the front; and measure one of the gravity vector $G_F$ based on a reception of a second message for the user to face directly above or the gravity vector $G_{SF}$ based on a reception of a third message for the user to face obliquely above, and wherein the first message, the second message, and the third message are one of displayed in the display device or a voice output from the display device.

\* \* \* \* \*